(12) United States Patent
Laurier et al.

(10) Patent No.: US 8,959,592 B2
(45) Date of Patent: Feb. 17, 2015

(54) METHOD FOR SECURING DIGITAL DATA AND IDENTITIES IN PARTICULAR IN A PROCESS USING INFORMATION AND COMMUNICATION TECHNOLOGIES

(75) Inventors: Prénoms Phillippe Laurier, St-Pierre des Corps (FR); Michel Riguidel, Paris (FR)

(73) Assignee: Institut Mines-Telecom, Paris (FR)

( * ) Notice: Subject to any disclaimer, the term of this patent is extended or adjusted under 35 U.S.C. 154(b) by 192 days.

(21) Appl. No.: 13/701,442

(22) PCT Filed: Jun. 1, 2011

(86) PCT No.: PCT/EP2011/002712
§ 371 (c)(1),
(2), (4) Date: Feb. 12, 2013

(87) PCT Pub. No.: WO2011/151066
PCT Pub. Date: Dec. 8, 2011

(65) Prior Publication Data
US 2013/0205371 A1    Aug. 8, 2013

(30) Foreign Application Priority Data

Jun. 1, 2010    (FR) ...................... 10 54272

(51) Int. Cl.
*H04L 29/06*    (2006.01)
*G06F 21/60*    (2013.01)
(Continued)

(52) U.S. Cl.
CPC ............ *H04L 63/0407* (2013.01); *H04L 41/28* (2013.01); *H04L 29/06047* (2013.01);
(Continued)

(58) Field of Classification Search
CPC ... H04L 29/00; H04L 29/06; H04L 29/06047; H04L 41/0803; H04L 41/28; H04L 63/00; H04L 9/00
USPC ............................................ 726/4
See application file for complete search history.

(56) References Cited

U.S. PATENT DOCUMENTS

2001/0029496 A1    10/2001    Otto et al.
2003/0188171 A1*   10/2003    DeCenzo et al. ............. 713/185
(Continued)

FOREIGN PATENT DOCUMENTS

FR    2932043 A1    12/2009
WO    2009/147163 A1    12/2009

*Primary Examiner* — Krisna Lim
(74) *Attorney, Agent, or Firm* — Baker & Hostetler LLP

(57) ABSTRACT

A method of securing and controlling data and identities within a communication process between an author and at least one recipient comprises at least: inserting at least one stamp in the computer or communication protocol associated with the data stream by means of a stamping system, the protocol containing the identity of the author, said stamp being a distinctive sign and a sign of recognition and a means of access to a secured account; the author using said secured account, administered by an anonymization authority, and said stamp being used to identify itself with said authority; the data stream comprising at least one instruction; at least one additional instruction having been registered with the anonymization authority and placed in the secured account; reading, at least one recipient, of said protocol by means of a reading system capable of detecting the presence of said stamp and then in extracting all or part of the additional instruction from the anonymization authority or from the secured account, said extraction being carried out from the secured account by the means of said stamp.

21 Claims, 20 Drawing Sheets

(51) Int. Cl.
*G06F 21/62* (2013.01)
*H04L 12/24* (2006.01)
*H04L 9/00* (2006.01)
*H04L 29/00* (2006.01)

(52) U.S. Cl.
CPC ............ *H04L41/0803* (2013.01); *H04L 29/06* (2013.01); *H04L 9/00* (2013.01); *H04L 63/00* (2013.01); *H04L 29/00* (2013.01); *G06F 21/606* (2013.01); *G06F 21/6209* (2013.01); *G06F 21/6245* (2013.01); *G06F 21/6254* (2013.01); *G06F 2221/2115* (2013.01); *H04L 63/102* (2013.01); *H04L 63/0853* (2013.01)
USPC ............................................. 726/4

(56) References Cited

U.S. PATENT DOCUMENTS

| | | |
|---|---|---|
| 2006/0155993 A1* | 7/2006 | Busboon .................... 713/169 |
| 2008/0244076 A1 | 10/2008 | Shah et al. |
| 2009/0094454 A1* | 4/2009 | Bazot et al. ............... 713/160 |
| 2009/0158030 A1 | 6/2009 | Rasti |
| 2011/0307691 A1* | 12/2011 | Riguidel et al. ........... 713/150 |
| 2012/0144186 A1* | 6/2012 | Puiggal Allepuz et al. ... 713/150 |

* cited by examiner

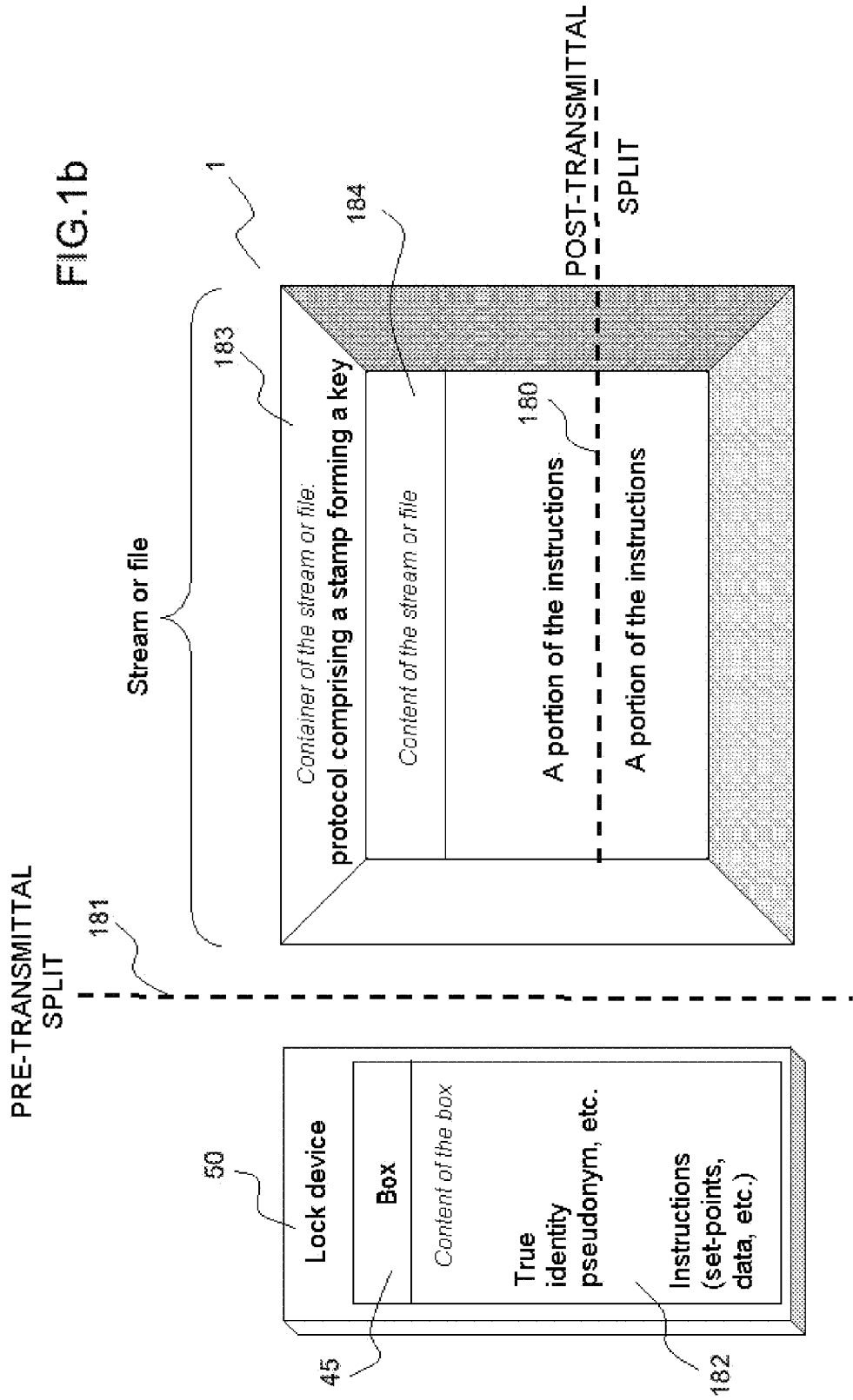

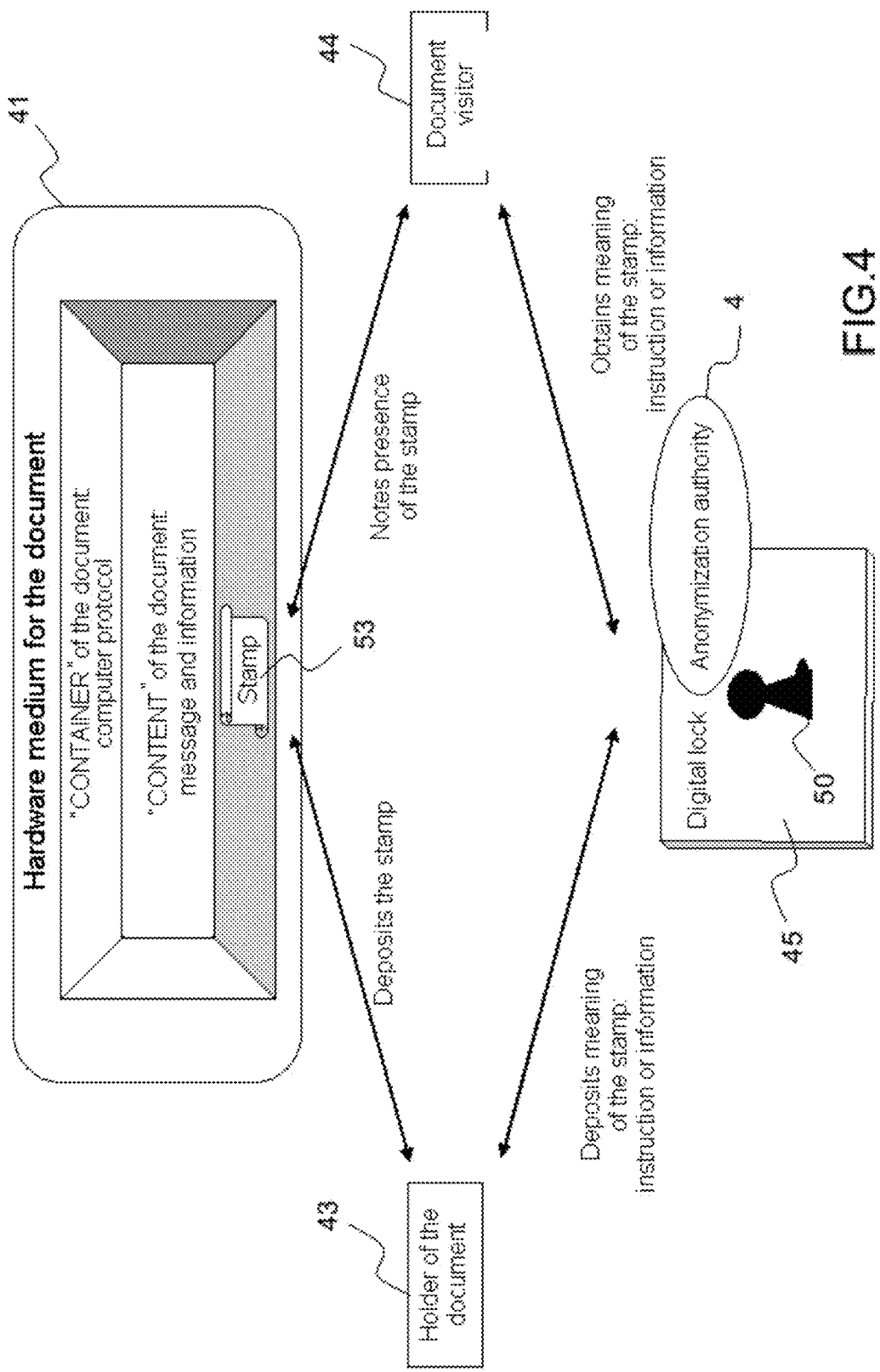

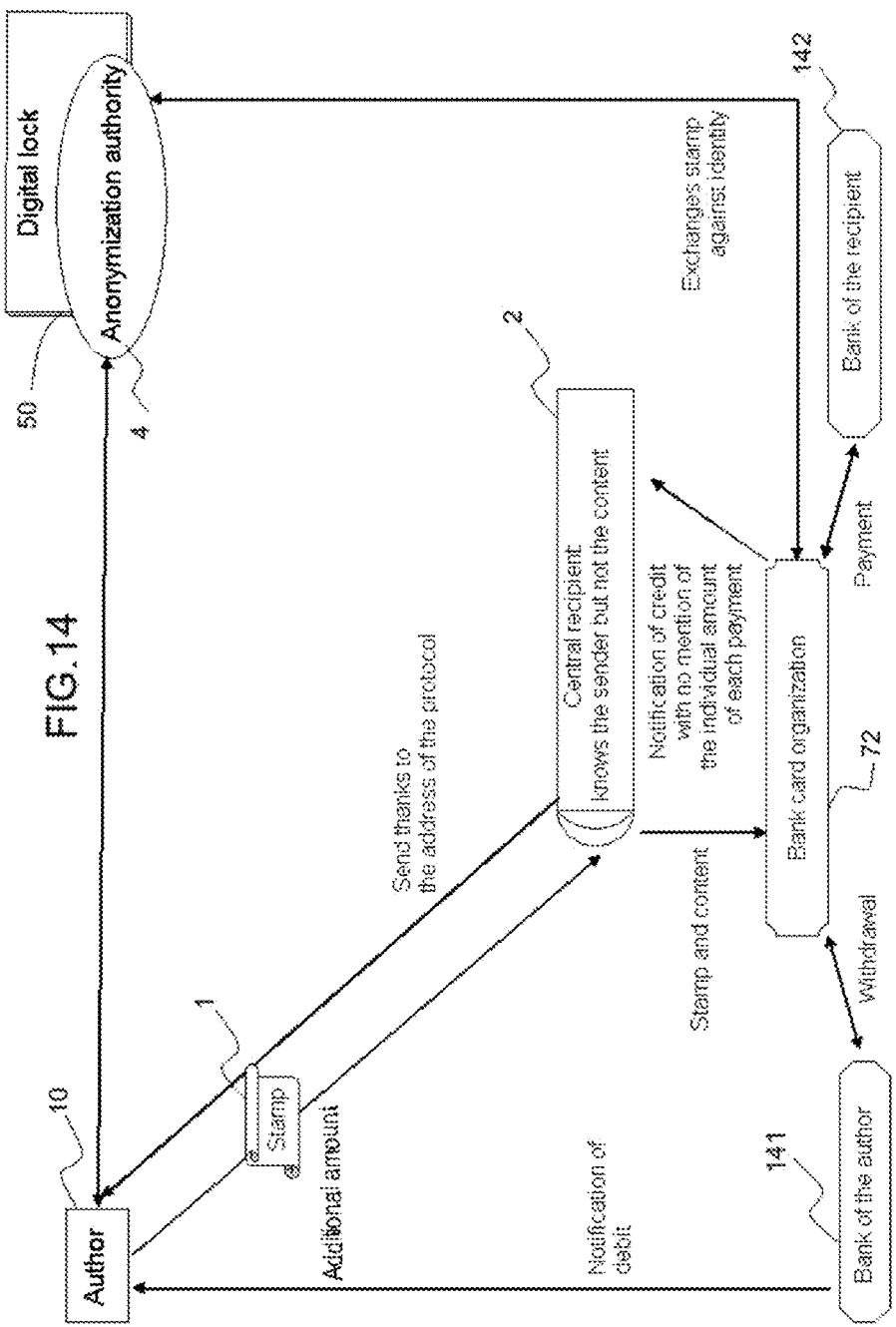

METHOD FOR SECURING DIGITAL DATA AND IDENTITIES IN PARTICULAR IN A PROCESS USING INFORMATION AND COMMUNICATION TECHNOLOGIES

CROSS-REFERENCE TO RELATED APPLICATIONS

This application is a National Stage of International patent application PCT/EP2011/002712, filed on Jun. 1, 2011, which claims priority to foreign French patent application No. FR 1054272, filed on Jun. 1, 2010, the disclosures of which are incorporated by reference in their entirety.

FIELD OF THE INVENTION

The present invention relates to a method for controlling, securing and protecting by confidentiality data within declarative, informative, administrative or productive processes using the information and communication technologies. This framework defines ways in which it may or may not be possible to ascertain these data, access them, hold them, process them or transmit them.

It applies to the management of data governed by computer or communication protocols, notably for the operations of geolocation, tracking, marking, profiling or identification, such as during online purchasing, bidding, thought-expression activities. This tracking and this identification being capable of participating in interchanges and transfers, such as financial or postal transfers, and in actions designed to approve, maintain, verify and guarantee a meaning, a magnitude or a value to these markings. It also applies to the activation and to the monitoring of an item of equipment or of a function such as the management of orders, using data governed by one of these protocols, in particular ensuring a monitoring of their nature, their qualities, their quantity, their usage or their operation.

A further subject of the invention is a better respect for personal privacy and what relates to the "digital intimacy" of people.

It applies notably to the reduction of the risks resulting from the handling of data that are considered sensitive.

These may be identity attributes: for example name, forename, postal address or telecommunication address, bank coordinates, bank card number and expiry date, social security number and other referents, personal codes, seals, signatures or distinctive marks. The latter help to identify, to gain access, through these items of information and scraps of identity, to personal spaces and personal functions, such as activating a bank account, being able to go to the place of domicile, trace or profile a person by name.

The invention may more generally apply to any item of desirable data, to frame its use or its status, such as confidentiality, integrity, availability, immunity, exhaustivity, completeness, validity, ownership. Data may be considered sensitive for reasons such as:

not relating to an identity of a sender but to that of the recipient,
relating to its location, a date or else a context, to the image of a function for prohibiting reading after a deadline date, or outside a given storage space.

BACKGROUND AND SUMMARY OF THE INVENTION

The important character of an item of data may relate to its purpose, such as the starting up of an item of fire-prevention equipment or an automatic routing.

The word "data" in this instance encompasses a spectrum ranging from the analog signal to the structured formatting of digital data in the form of information or of instructions. This formatting and the content arise from the knowledge of their author and belong to his assets with similar needs to be secured per se and in their structure. The information may be both digital and analog, irrespective of its final expression for an observer, by figures, letters, drawings, videos, pulses, colors or else sounds. It may be found in various forms such as magnetic or optical. The distinctive criterion of the present invention, for its operation, being that this item of data is conveyed or preserved in a frame, considered to be the container, which takes the form of a computer or communication protocol. At the limit, it may be a simple container, with no content, in which the simple fact of receiving it becomes in itself informative or initiating.

These protocols may be called "proprietary", or "open" when the interfaces are public and it is therefore possible to communicate syntactically with the black box.

It may involve static data on their medium, up to the extent that their access, their integrity or their application depend first on a protocol.

Any instruction, request or item of information that will be sent to it having initially to pass through its computer protocol, hence find itself faced with an optional marking or distinctive sign according to the invention which would be present therein and would correspond to the issuing of unavoidable instructions. This subjecting to instructions may in particular culminate in forms of interdictions or of authorization, of activation or of stopping of a mechanism, of limitations of action, of evasive attitude or of conditional clauses. It may also culminate in a delivery of additional information when said distinctive sign inserted in the protocol, also a sign of recognition, serves as a passport to these additions.

In what follows, "file" will refer to a document or a computer program, an executable, a software entity, a virtual entity such as a virtual memory.

In what follows, "mail" will refer to a message, a transmittal of a file or of documents, a telephone call, the participation in a dialog, a visit carried out by telecommunications, and more generally any form of stream, of transmission or any form of interchange by placing in relation or connection. This mail may be carried out between several media, or inside one and the same item of equipment, involving a movement of data from one zone to another within for example a computer, or a circuit board, to the extent that this movement makes use of a computer or communication protocol. The term mail applies to peer-to-peer, when the message is chopped up as in the case of a distribution of data on disks or servers connected to the Internet.

In what follows "author" will refer to the sender of this mail. In the case of a passive component such as an RFID label, the author will be considered to be the label and its holder, and not the terminal that created an electromagnetic field. In the case of a static computer file, the term author may encompass, in addition to what or who conceived it, what or who is at the moment in question the holder, the depositor or the manager of it.

The hardware medium of the mail may be a communication network, notably a telecommunication or broadcasting network, and mobile physical means such as a USB key, a chip card or magnetic card, a disk, a badge, a ticket such as a subway ticket, a pass with contact or without contact such as a transport card.

The recipient object may be a medium or a telecommunications or broadcasting terminal such as a television set, a video recorder or a decoder, and more generally any item of computer or electronic equipment capable of participating in a distribution of information. With respect to the recipient of a movable medium of mail, this may be a computer machine furnished with sockets such as USB, a cell phone, a digital assistant or diary, a card or disk reader, an automatic teller for the delivery of bank notes for example, an entry antechamber or else an identification terminal, as examples.

The recipient may be external, for example a participant receiving a mail or gaining access to a file, as well as internal, like a content of a file or of mail, provided with technical capabilities which render certain components thereof active, autonomous and capable of participating in actions for example of collecting data, such that they are "intelligent agents". These autonomous entities, furnished with cognition and with abilities to interact with their environment, can communicate with their own protocol and make of the distinctive sign according to the invention a use that is identical to that of an external recipient. It may therefore involve using this sign, with its functional and cryptonymic properties, and as a sign of recognition.

Hereinafter, "central recipient", with respect to this mail, will be called the recipient considered by the author to be the natural intended recipient of his mail. It may in particular be a commercial web site, a biological analysis laboratory required in the context of an anonymized examination, a toll road management company using tickets or passes such as magnetic or electronic passes, without wishing to record the true name of its possessor.

The central intended recipient may be neither the initial recipient of the stream nor its final recipient.

The other recipients will hereinafter be called "peripheral recipients" and will be able to be:
 a bank card management organization;
 a bank;
 a postal administration;
 a routing or transport company;
 a telecommunications operator or an Internet service provider;
 an administration issuing documents of a nominative character such as attestations, certificates, passes or visas;
 a structure managing medical files for patients;
this list not being limiting.

The invention forms the structure of and supports a set of several players, amongst which there are the author, the various recipients, authorities hereinafter called anonymization authorities. Added to these are one or more entities hereinafter called lock, which may be considered either to be active or, in a more complete form, passive and reactive to the actions of the other players.

This set is deployed around a distinctive and characteristic sign inserted into the computer or communication protocol.

It takes the form of a triple device:
 on the one hand, this marking by a characteristic sign, called a stamp, inserted for purposes of distinction, of recognition, and of transmission of instructions or information. This multifunctional stamp, placed in computer or communication protocols will be used, for a recipient, as information per se or as a means of obtaining additional information from an authorized third party;
 furthermore for partitioning and channeling data or players, by the insertion of the stamp associated with an anonymization authority and with a lock acting as a cryptographic protocol for controlling access to instructions;
 the third device results from the fact that the stamp takes the form of a varying cryptonym, itself being able to be connected to an invariant and stable pseudonym.

A first particular feature of the invention results from its statement that a more secure way of not having a thing stolen is not to hold it or know it from the outset. A commercial site on the Internet having a stock of computer data relating to the payment instruments of its clients can offer them only an imperfect guarantee of security against increasingly professional computer hackers.

One advantage of the present mechanism lies in its ability to frame this communication, this holding or this processing of data that are considered sensitive, in order to remedy the weaknesses mentioned. The result of this is a reduction of the risk during their various usages and in the possibility of their loss, theft, hacking or other form of loss, of imperfect scrapping, of duplication, of subcontracting, of outsourcing or else of legal transfer of property such as a subsequent purchase of business assets.

The present invention modifies, recomposes and broadens devices expressed in patent application FR 2 932 043 relating to a method of traceability and of resurgence of pseudonymized streams on communication networks, and a method of transmitting streams of information that is capable of securing the data traffic and its intended recipients. The novel invention flushes out the portion associated with digital confidentiality and articulates it with novel functions for data security, action monitoring and information distribution.

For this purpose, it is based partly on the system of distinctive and characteristic marking inserted in the protocol, and furnished with functional properties as described in patent application FR 2 932 043.

This characteristic sign is called a stamp, by analogy with the placing of a stamp as a signature that personalizes but also as a mark that modifies, signals and serves as an external sign of endorsement. This "marking", which encompasses just as much a possible encapsulation, covers an operating mode consisting in a characteristic addition, amputation or modification, to or from a protocol, while complying with the standard of this protocol. As examples, it may involve the labeling or the tattooing of an IP packet, a stenographic marking or else the use of an additional protocol.

The general properties that arose therefrom for this system were:
 functional;
 cyptonymic, as a stamp of an author placed in a protocol, which designates it and identifies it, if necessary without naming it other than by an arbitrary convention.

Obtaining knowledge of the functions and of certain attributes of identity concerned requires addressing an anonymization authority on which the informing role makes these two properties operative. The main joint use of the functional and cryptonymic arrangements consists in preventing the reading of the identity of an author of mail, as it appears otherwise in the rest of the protocol. Therefore, the device culminates in a stamp masking this identity.

A second enhancement relating to the stamping of the protocol consists in varying its effects in several ways:
 It may involve having simultaneously, for one and the same author, several stamps that can be activated by choice or according to charters of use that are defined and updatable. These signs will be either dissembleable per se, or distinguishable by another means such as for example a timetable which may or may not be for work at the office, hence of presence or absence in place of the desired person. Each of the stamps then corresponds to determined items of information or instructions, such as the designation of only one of the bank accounts of a person. This will allow this author, in the event of a purchase from a web site, to choose which account is to be debited. This adaptive character will be found in the fact of having had several bank accounts preregistered, or several payment cards or else for example several addresses and more generally any attribute capable of existing in several copies.

Another way of varying the effects would consist in predefining them as a function of each interlocutor listed in advance, or as a function of typical modalities followed by them in order to make the request.

A third enhancement results from the fact that the number of stamps in a given protocol is no longer envisaged as an obligatory singular element. Several of these distinctive signs will be simultaneously possible in a mail or a file, either for independent usages or users, or to create between these signs links, respective sureties, or one-off relationships. It also becomes possible to envisage that their presence as much as for example their respective spatial disposition, should carry an additional meaning, that can be interpreted by all the recipients or only some of them, who may or may not be assisted on this occasion by the anonymization authority.

A fourth enhancement with reference to the stamping of the protocol results from the fact that not only communication protocols but protocols assigned to static data are concerned. Thus, it is no longer a question of only content associated with a stream, but content capable of being an intended recipient of a stream.

A fifth enhancement results from the fact that the stamp, also a sign of recognition, is invested with properties encompassing those of a passport: it allows access or delivery of data other than functional data, as were the instructions. It goes beyond this passport status, since it is in itself the equivalent of a key for gaining access to a virtual room of safe-deposit boxes, in which certain secured accounts are provided for the person's arrival. These secured accounts can also be called boxes.

The anonymization authority is coupled with a mechanism called a lock. These two entities can be combined into one, but can advantageously be kept in an autonomous situation supplemented by information transfers between them.

Hereinafter "lock" will be referred to as a device acting as a cryptographic protocol for controlling access and responding both to a digital data item and to an analog signal, and of which the response could be equally digital or analog. The terms lock device or lock will be used without distinction.

The anonymization authority serves as an interface with the author, granting him the stamping systems, agreeing the meaning and the equivalence of these stamps as instructions, information or values. It also agrees, with and for him, a stable pseudonym associated with the successive cryptonyms that these stamps are and by knowing him by his real identity.

As a minimum, the lock receives information on the stamps of the author. In wider configurations, it may receive the pseudonym of this author and his contact information or telecommunication identity. The latter corresponding to what appears in the complete communication protocol of one of his transmissions.

The operation of this lock is subdivided into two categories of assignments.

In a first mode, it is used to validate the reality, the authenticity and the actuality of a stamp presented to it by the recipient of a transmission carrying such a mark. The stamp is then similar to a physical key that a person would seek to insert into a physical lock, purely to verify that they match. Such a verification can be carried out in two different ways:
  according to the first, it will be satisfactory to verify whether the transverse profile of the key, to use imagery, with its specific grooves, does in fact match the cutouts of the entrance orifice of the lock, and therefore to verify whether it will or will not enter this housing;
  according to the second, the action will not consist only of inserting the key, but of trying to turn the lock. In this instance it will be considered that the longitudinal profile has been able to remain hidden from the recipient, in parallel with the fact that he will not have access to the internal morphology of the barrel. By transposition, the hidden longitudinal profile of the key corresponds in this instance to the portion that remains functionally barred from access within the protocol and the internal morphology of the barrel corresponds to this same portion as known by the lock.

The first usage will serve to validate that a stamp presented by a recipient is real, authentic and actual.

The second usage will serve to confirm with the verifying third party that the portion that is visible or accessible for him in the protocol is indeed coupled with the portion that has remained invisible or inaccessible to him, for example the communication identity.

In a second mode, it serves for all the normal uses of a lock, such as to actuate a mechanism or a signal, authorize or bar an access, open a box, have oneself recognized. In this instance it may involve, for example, procuring for the recipient who uses it access to or receipt of an instruction or an item of information. This function may arise equally from an automatic system that is independent of the will of this user and a configuration in which he can choose what he needs in a secured account that has been previously filled with various data by the author of the mail or of the file and optionally by the anonymization authority. This box can be personalized and reserved for access by a single predesignated recipient as well as being accessible to several or all the possible recipients. This box may finally also be likened to a furniture storehouse, in the event that the author chooses to be his own intended recipient. Access to the box can be conditional upon all forms of suspensive constraints or conditions, such as opening only after a determined date.

Said safe-deposit box of a given author can be subdivided and likened to a wall-mounted set of mail boxes of an apartment building where each resident, that is to say in this instance each recipient, has the means of gaining access to the content of his box.

In an intermediate variant, a recipient who is occasionally authorized to gain access not only to one but to several boxes, could be sent a key:
  which opens the boxes concerned one by one;
  or which opens for example a single front panel corresponding to these boxes, to the exclusion of the other boxes, and according to a cache logic which continues to mask the contents or the locks of these other boxes;
  or to give this recipient discriminated access to these various boxes, for example according to chronological rules or by a marked out and predetermined succession which gives access to a particular box only after the opening of another or after the accomplishment of a particular intermediate formality.

Such a collection may equally and advantageously be carried out by a marking system in a lock where a cryptonym inserted in it would come out of it again with the additional imprint of this pseudonym. This, in the same way as a physical key that is uncut in its longitudinal direction can be inserted into a lock and be marked inside, by chalk or paint previously sprayed onto the internal fittings, with a contour delineating this sought contour. Or in this instance, by transposition in a basic form of a contour delineating the pseudonym. This method is not intended to open the lock, but to learn a second item of information, the longitudinal profile of the key, when a first item of information is known, the transverse profile of this same key, which makes it possible to insert it into the lock. This mechanism can be used as much to obtain a pseudonym as to obtain knowledge for example of the portion remaining inaccessible of the communication protocol, or as any instruction or item of information. It differs from the preceding "second mode" that were the actuation of a mechanism, of a signal, of an access or the opening of a box. Currently, no actuation actually takes place, but the simple apposition of an informational imprint on, with, around or in a previous imprint serving as a key.

In this way, not having a stamp forming a cryptonym prevents subsequently having the pseudonym to which it is linked, or any other information or instruction that is considered sensitive. So doing, the lock differs from a function called a "trusted third party" function in that the trust is not necessary but replaced by a mechanical method in which access to an informative step is materially conditional upon the correct control of the previous step.

The function usually devolved to a "trusted third party" is furthermore subdivided between an anonymization authority and this lock. Thus, the anonymization authority can optionally remain ignorant of what will be deposited in the box, or of who will verify a stamp. Just as the lock may not know the real identity of the possessor of this sign.

In a variant, the recipient can be required, in order to be able to verify a stamp with the lock or to activate a mechanism, to himself make use of an identification system or more frequently an authentication system which points him out as the known and authorized recipient. One configuration could be a box with two locks, or more than two. This second digital key will hereinafter be called the counter-key.

The person made responsible for this task opens it in company, for example, with a predefined colleague who is the carrier of a second counter-key. This third party, an auxiliary, a witness or a guarantor, may the initial author of a mail, or the holder of a computer file marked in its protocol, and the person who wants to be informed on the subsequent use made of this stamp or of this file, and to be present on this occasion. This may equally be the anonymization authority.

The present invention differs primarily from the patent application FR 2 932 043 by the fact that it modifies the favored general architecture thereof by the adoption of different split lines.

The invention is distinguished secondly with respect to this partitioning, in that it does not propose the same arbitrage between information that can or cannot be read, in the sense notably of being accessible to a given recipient. Amongst these new arbitrages, there is the fact of partitioning, channeling and, if necessary subsequently or at intervals, confronting, juxtaposing or composing information that is present simultaneously in the protocol of a telecommunications stream such as the address of the sender, and outside this protocol, even outside this mail or even outside the anonymization authority or the lock, such as the references of a bank account.

The result of this in total are novel functionalities which make it possible to widen the field of information that can be protected or monitored. More generally, a particular feature of the invention, on the matter of protection against risks resulting from the holding of an item of information, arises from the fact that it is no longer truly a holding, with the fact that it is no longer truly "an" item of information, both in its singular and exhaustive acceptance, and in relation to a unit of location, of time and of action.

Within what was previously presented as a triple device, and relative to the third of the latter, there is an authority called an anonymization authority, already mentioned in patent application FR 2 932 043.

With respect to this patent application, the present invention provides several enhancements concerning the anonymization:

The first of the changes sees to it that the anonymization authority can grant the insertion of stamps in protocols of static files capable of being received from a stream such as a request.

The second results from the appearance of a structure of the two-headed type, in which the anonymization authority is joined by an entity called lock.

Thirdly, the invention allows the existence of several anonymization entities instead of only one, and the expression of preferences emanating from their users.

A fourth point lies in that the border line between the anonymization authority and the peripheral recipients is adaptive and movable if necessary, allowing, for example, the first to hold a number of data items of a banking character, or conversely allows a bank to know or to manage various components of the identity-pseudonym link.

Fifthly, the responses that can be supplied by this entity are broadened. The stamp is no longer only a means of dialog between the anonymization authority and the recipients to allow the latter to understand initial instructions hitherto preventing reading concerning a mail. As for the items of information, in patent application FR 2 932 043, it involved transmitting essentially the correspondence between a cryptonym and a pseudonym, or optionally mentioning for example whether this visitor who remained unknown was a usual visitor or not.

In addition, simultaneously or subsequently, the authority or the lock will in future reply by transmitting or allowing access depending on their right to know it, to the equivalence between such a stamp forming a cryptonym and for example a real identity or other occasional attribute of a person such as an address, as well as any type of data item that has been saved, for example a computation element deposited by this person, and any sort of instruction. This may be a mixture of information and instructions: mathematical data and a test to be run with accounting data and breakdown to be applied in the accounts books, dimensions and the launching of a machining operation. An item of information deposited may also be likened to the principle of a half bank note, torn in two, and without which the second portion already known or held by a recipient would remain unusable, or incomprehensible if it involved an image less well known than a bank note.

In a business context, the actions could be the giving of orders, the supervision of tasks, obligations to sign or authorize prior to an action, and more generally all activities involved in a chain of command, a logistics chain or else accounts monitoring.

The security of people, of goods and of buildings may require the presence of these markings of which the functionally unavoidable character for a recipient will liken them to a protection which prevents its access or its use from a person who is considered clumsy.

In addition to delivering instructions, it may involve the delivery of information making it possible to complete a task or to make it easier by a connection with operating instructions, or even to render obligatory the use of these operating instructions.

The invention can serve as a cue card relating to a certain intention or a certain task. At the limit, in the case of a computer file or of a mail with no content, the protocol with stamp will on its own be a transmitter and a cue card that can be likened in its result to the slips of paper that can be stuck on a wall and carry any wording that the author intends for himself or for others.

This previous situation covers a field of application in which the stamp, with or without the rest of the protocol, can notably be used as:

a reminder system;

an anti-repudiation system, since the recipient will be indicated to the anonymization authority in order to understand the meaning of the stamp;

an anti-duplication system, when the stamp per se has a role or a meaning that does not become operative or comprehensible other than by compulsory contact with the anonymization authority. The latter then being capable of identifying duplicates and distinguishing them from normal transfers of the stamp between players participating in a process. This arrangement will allow a use for expressing and guaranteeing magnitudes, values or symbolisms: it may involve an equivalent of the handover object system, materialized for example by a single flag passing from hand to hand between drivers on the single-track railroad lines. This principle which is equally the token principle, used in computer and communication technologies, would be articulated here in the creation of a situation in which the anonymization authority serves as the station master supervising this distinctive sign passing between successive recipients.

These situations confer on the anonymization authority a status of organizer or at least of guarantor, like a kind of bailiff, a notary or a registration chamber capable of witnessing a meeting, a contact or a dialog. The registration chamber being able to access more sophisticated functions such as those of a clearing house.

As such, the anonymization authority is a distributor as well as a recipient of secrets. This public-officer function is boosted by the fact that the delivery of counter-keys can serve for a third party to be present.

The anti-repudiation system is a matter for traceability and that concerning duplication adds a quantitative control to that preceding tracing.

These arrangements make it possible to create equivalents to transmissions with acknowledgement, to postmarks, to official seals and other seals expressing a doubled meaning of an exclusivity, of a rarity or at the very least of a quantity under control. In the same postal field, it may involve transmitting stamps invested with a face value, like a postage or tax stamp.

Through the foregoing features, the device according to the invention covers businesses based on trust, fiduciarity, including those relating to the creation or the handling of money.

Concerning electronic wallets of the chip card type, their use of computer or communication protocols makes it possible to deploy the present stamps therein.

Concerning the other solutions, a particular feature of the device according to the invention is to be able to make use of support both to a monetary exchange device and to an electronic payment system, depending on its mode of deployment:

this device enhances trust in the link and the vector between players involved in one and the same process;

or it is oriented around players who enjoy more trust in the eyes of the others;

or finally it transfers the trust to itself in its entirety, then allying virtual and electronic spheres.

For the first two situations:

If the trust is centered in the link and the vector, that is to say the stamp that passes from a sender to a recipient, it is then similar to a token, a coupon, a voucher for the bearer, a fiscal coin or stamp, taking on a fiduciary dimension, like a virtual stamp. As a distinctive sign, it is recognized as a value, a magnitude or a symbolism attached to it, that can be sent to others, that is releasing to the extent that the latter wishes to share this perception of value and believe in the robustness of the stamp and of the mechanism that maintains its unique character. The stamp may be an amount visibly expressed moreover by a number. However, the cryptonymic properties of this stamp open a field in which its correspondence to a value will refer to an arbitrary agreement between at least two players participating in the exchange, or to any other interpersonal activity that can arise from a consensus of valuation. In addition to the virtual worlds, that are massively multiplayer, the invention may touch notably the promises of donations and payments, online games, online or even direct bids, calls to place a value on goods or immaterial magnitudes and to exchange them or merge them on the basis of these respective values.

If the trust is centered on one or more players, to whom the partitioning used by the device points, the latter play a pivotal role during an intermediation, like that of a bank. In this instance, the stamp does not in itself invest this previous fiduciary dimension and this autonomy, but it is a sign of recognition which refers the involved parties to one and the same secret held and managed outside it, according to the present device of central and peripheral recipients, and of anonymization authority and lock. It is also functionally an instruction, such as for payment. The stamp is a passport to players capable of carrying out for example a transaction while giving their guarantee to those involved as to the unit of account concerned and to the passing in correct and due form of the promised writing game.

These two options do not exclude one another where the stamp might be of a fiduciary type and the equivalent of a banknote, or of the scriptural type and the equivalent of an order to pay or of a bank check, or even hybrid if the check, through the practice of endorsement, becomes in itself a vehicle for a written value.

The authority is called the anonymization authority because of the fact that the stamp that it grants performs the function of a cryptonym. This cryptonym, that is usually varying, attached to a pseudonym that is usually unvarying, will in this instance find a broadening of its applications through the evolution of the functions and of the partitions, in that, while relieving the central recipient of certain items of knowledge, it nevertheless preserves in its favor a possibility of progressively capitalizing a detailed knowledge concerning the author, the visitor to its web site for example, via its current or past behavior, irrespective of the fact that his prior visits may or may not have been accompanied by a purchase.

Capitalization transferred to the pseudonym, attached to the cryptonym inserted in the protocol of the stream.

The invention creates an identity management with drawers. The anonymization authority is therefore similar to a supplier of bundles of digital identities with drawers.

The subject of the invention is therefore notably a method for securing and monitoring data and identities within a communication process between an author and at least one recipient, said method comprising at least:

A step of inserting at least one stamp in the computer or communication protocol associated with the data stream by means of a stamping system, the protocol containing the identity of the author and for example of at least one recipient, the stamp being a distinctive sign and a sign of recognition and a means of access to a secured account, and also for example a mode of activation of mechanisms or of signals and correspondence of identities.

The author using said secured account, administered by an anonymization authority (4), and said stamp being used to identify itself with said authority.

The data stream comprising at least one instruction.

At least one additional instruction having been registered with the anonymization authority and placed in the secured account.

A step of reading, at at least one recipient, of said protocol by means of a reading system capable of detecting the presence of said stamp and then in extracting all or part of the additional instruction from the anonymization authority or from the secured account, said extraction being carried out from the secured account by the means of the stamp which is for example the carrier of a secret which opens a lock device acting as a cryptographic protocol for controlling access to said account.

In the case in which the stamp is cryptonymic, it is for example attached to at least one pseudonym.

In one particular embodiment, the data stream is found, on receipt at the recipient or upstream of the recipient, partitioned and channeled, or for example masked, processed, confined or refused, by portions of instructions, said portions of the mail or of the file being able to be predetermined, and said partitioning, masking, processing, channeling, confinement or refusal being carried out according to the instructions received from the anonymization authority or via the lock device, by the means of the stamp.

The protocol of the data stream is found, for example on receipt at the recipient or upstream of the recipient, partitioned or masked, processed, channeled, confined or refused by portions, said portions of the mail or file protocol being able to be predetermined, and said partitioning, masking, processing, channeling, confinement or refusal being carried out according to the instructions received from the anonymization authority or via the lock device, by the means of the stamp.

In one possible embodiment, the stamp corresponds to different responses or different ways of responding on the part of the anonymization authority and of the lock device, to different functionalities or modalities, or different delivery modes, depending on its intended recipient, the context and the environment in which this intended recipient moves, the chronology or the location of the facts, the way of acting or of being of this intended recipient, the nature of the data or of the signal corresponding to this stamp or to what it will apply, these operating modes being able to be pre-established and discriminated according to items agreed with the author, and endorsed on a per-case basis in one or more steps.

On the one hand, the stamp acting as the key and, on the other hand, said lock are each for example totally or partly the respondent of the other, either as a profile and counter profile, or as an image and its negative, either as a die and its work, or as a scratch and its scar, this complementarity toward a whole or toward a succession generating capabilities of dialog, of correspondence, of reconstitution of the whole or of the filiation, for purposes of validation, identification or authentication, of actuation of a signal or of a mechanism, of expression of a meaning or of an instruction, or of positive connection between them.

The stamp serving as a key of the lock device, that is to say opening this device, it engages for example an access, an actuation of any form of antechamber and door giving onto a reserved space. It may also engage a mechanism or a registration, an action or a technical reaction, or else an informative or declarative signal.

The lock device may exist, independently of the secured account or other subordinated device, for the purposes of validation of the reality, the authenticity and the actuality of a stamp acting as a key.

An operating instruction transmitted or accessible via the stamp is an authorization, an interdiction, that are total or partial and discriminated, the enactment of requests or of conditional clauses, the activation, the modification or the stopping of a function of a recipient.

The communication stream or the file consists only, for example, of the protocol marked with the stamp, to the exclusion of any content.

The anonymization authority or the lock device holds, for example, any type of instruction, data item or signal relating to the management of a stream or of a file furnished with the protocol with stamp, as well as any type of instruction, data item or signal connected to this stamp or to a given identity, but independent of this direct management and for simply making them available from the author to a recipient.

The lock device, acting as a cryptographic protocol for access control, is for example furnished with portions that cannot be seen by a recipient, allowing the validation of a cryptonymic stamp, or of a data item that has remained unknown and corresponding to these nonvisible portions, or of the link between this known cryptonym and this unknown portion, or of the link between several unknown portions, the unknown portion being a pseudonym, a real identity, the rest of the computer or communication protocol, the content of the file or of the mail or any other information or instruction.

A lock may align a juxtaposition, a succession or a composition of said counter-profiles, of said negatives, of said dies or works or of said scars, corresponding to at least one stamp and to other data such as a pseudonym.

Advantageously, the lock, when it is tested by the stamp, allows the appending or the insertion of additional data in, with, around or on this stamp.

A functional instruction, relating to the communication, to the processing, to the reading or to the storing of data, results for example from the presence of the stamp in the protocol, the instruction concerning the content of the stream, of the file or the rest of the protocol.

The interdiction or the partial functional authorization concerns for example a predeterminable portion of the mail or of the file, both in its content and in its protocol.

The interdiction of processing, of reading, of communication, or of placing in memory of certain data items at a recipient is accompanied for example by their orientation toward another peripheral recipient provided for this purpose.

The interdiction of placing in memory certain data items at a recipient is accompanied for example by the elimination of these data items.

The stamp is for example used by its successive recipients as a sign of recognition between them or with the author, and for obtaining from an anonymization authority or via a lock the correspondence between this stamp and attributes of the identity to which said stamp is attached, or any other data item or signal, preserved by them for the purpose of this transmission.

The anonymization authority or the lock device is for example authorized to transfer to a recipient or a homologated third party, said correspondence or said data items, said recipient or third party using said correspondence or said data items to accomplish a task devolved to it by a previous recipient or by the author of the stream or of the file.

Said task adds, for example, an item of information, received from the anonymization authority or from the lock device, on a task that has remained partly or totally anonymous or incomplete, awaiting identity attributes required for using it, conveying it or finalizing it.

Said task relates for example to an electronic transaction between the author of the mail or of the file and a main recipient.

Said task relates for example to a conveyance that is physical or by telecommunication between a main or peripheral recipient and the author.

Said task relates for example to a writing game, that is carried out between the author and a main or peripheral recipient.

Said task relates for example to a verification of the operation, of the behavior, of the state, of the integrity or of the authenticity relating to a communication terminal or medium, and the mechanism that are connected thereto.

A peripheral recipient serves for example as the anonymization authority for the correspondence between the stamp and various data or responses attached thereto.

The anonymization authority is for example notified of a recipient delegated to a task or a role by the author or by a previous recipient.

The anonymization authority, assisted or replaced by the lock device, transmits for example the correspondence between a particular cryptonym, a particular pseudonym, and on the other hand behavioral or situational information or information relating to the past or to the profile of this author for the purpose of characterizing him without necessarily transmitting either his true identity or another of his pseudonyms.

A stamp inserted in a protocol or the pseudonyms that are attached thereto, or sub-portions that are autonomous or consisting of these three options, may be used to mark or tattoo objects, matters or real beings for the purposes of recognition, of validation of right or of status, of assignment of value, of belonging or of dependence, of connection, of identification or of authentication without revealing a true identity.

A file or mail content, furnished with technical capabilities of interaction with their environment, which render certain components thereof active and autonomous, may begin dialog with their own protocol, and make a use of the stamp that is identical to that of an external recipient.

BRIEF DESCRIPTION OF THE DRAWINGS

Other features and advantages of the invention will appear with the aid of the following description made with respect to the appended drawings which represent:

FIG. 1b, the partitioning and channeling mechanism with the split lines and their sequencing in time;

FIG. 4, the case of a static document that is present for example in a computer, where a stamp is inserted into a computer protocol;

FIG. 14, a particular mode of deployment of the method according to the invention in which a recipient will have access to attributes of identity or of information that are present in the computer or communication protocol, but without knowing the nature and the detail of its relation to be followed with the author. In this way, he will be informed of the existence of this link only;

DETAILED DESCRIPTION

Figure 1A:
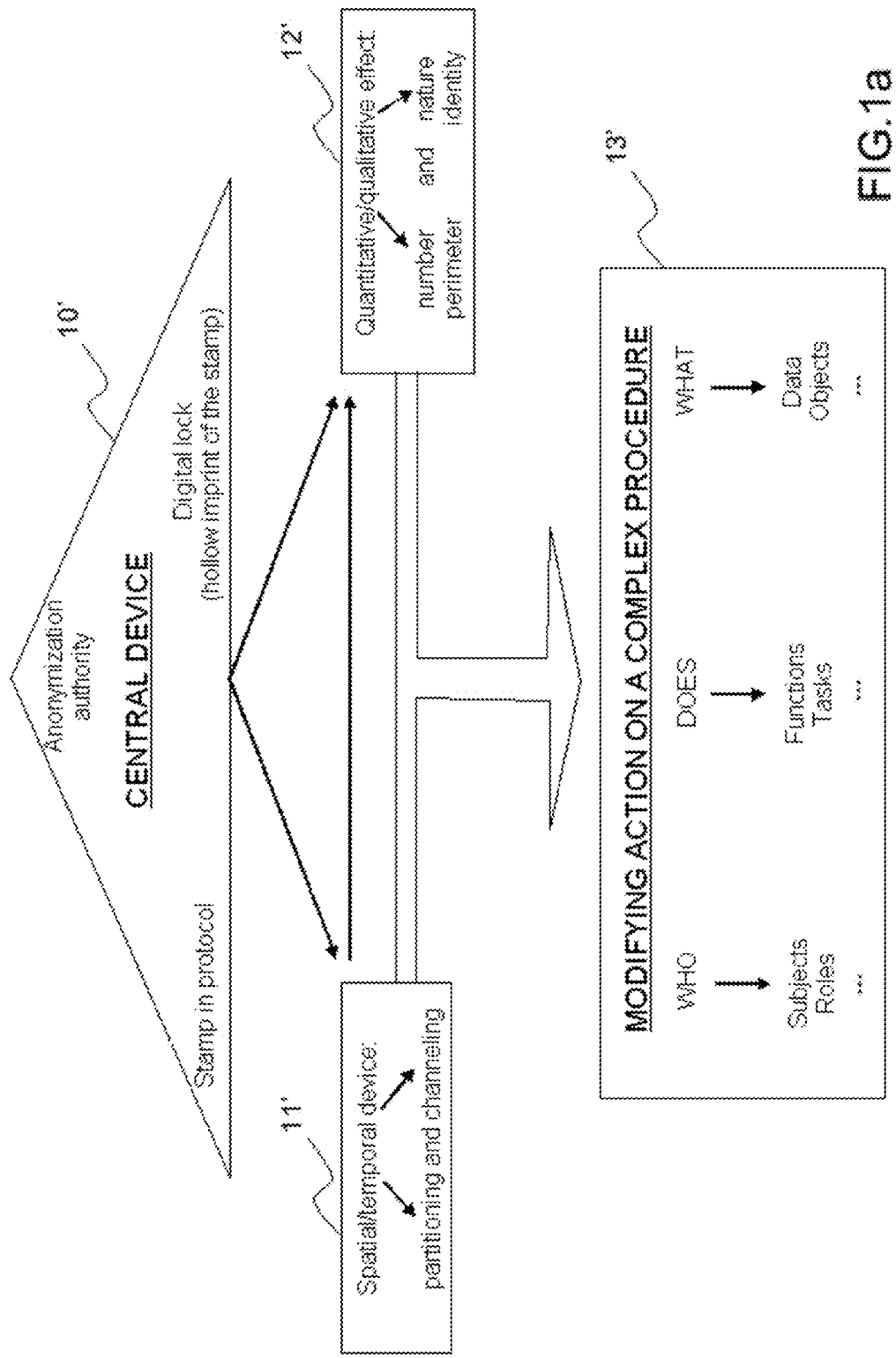
FIG. 1a, a nonexhaustive summary of the device according to the invention, in its mechanism and in its effects on any complex procedure and on the entities involved in this procedure.

FIG. 1a illustrates in a simplified and nonexhaustive manner the general principle of the method according to the invention, in its means, its actions, its points of impact and its consequences. The invention uses a device 10' consisting essentially of three central tools that are an anonymization authority, a means for marking computer or communication protocols with a distinctive and characteristic sign called a stamp, and a lock called a digital lock. This lock constitutes per se a counterpart to the previous distinctive sign since it represents, amongst other functionalities, a hollow imprint of the latter, and its original mold since the chronology of their respective birth can be turned over as well as placed simultaneously, just as it can involve a negative of an image, a counter silhouette or a counter profile, the scar, furrow, an event, optionally standardized, as in this case this stamp. From this parentage multiple functions of identification, of authentication, of validation but also of coupling to the principle of tenons and mortises can be born. It may also be the appearance of a meaning or of an action when they are united.

These three complementary tools which have other qualities described hereinafter work together to generate a device 11' that can be qualified as spatial-temporal in the sense that it organizes a space in which will intervene several players involved in one and the same complex procedure such as a purchase on the Internet or the geolocation of a communicating object. This organization of the space is an architecture that is imposed on these players, on these objects and on data hence on knowledge or secrets, or else on actions. The architecture is invested with a temporal dimension since it participates in the creation of chains, of sequences, of priorities or of simultaneities between these actions. Thus the spatial-temporal device simultaneously puts in place:

- partitions: that can be expressed by the fact notably of parceling entities and actions, of separating them and making them autonomous or subjected to different results, as well as to mask, scramble, unmark and make anonymous;
- a channeling mode: that can be expressed by the fact notably of distributing them in a parallel or sequential manner, composing them, creating links or cooperations, aggregating, demasking or re-marking these entities or these actions.

This device 11', through its partitioning and its channeling, assigns in a definitive or provisional manner and therefore a sometimes reversible manner the entities and the actions concerned 12' under their two quantitative and qualitative properties. The quantitative encompasses in particular the fact of multiplying or reducing the number thereof, of modifying the scope thereof, while the qualitative relates above all to the modification of their nature or of their identity. The identity of a person or an object being able even to be considered as the first of the qualities of which it is made up.

The whole of this spatial-temporal device acting on the quantitative or qualitative facets of any complex process will be applied to the three components of this process 13' that can be summarized by "who does what". "Who" designating for example the subjects or the roles held by them, the verb "to do" designating a particular task or a particular function, and the "what" designating the object or else the data concerned. A partitioning or a channeling may in this way assign the "who", but also the "what" or a function. Modifying the number, the scope, the nature or even the identity is applicable equally to this "who", to this "does", and to this "what".

FIG. 1*b* specifies the general mechanism of partitioning and of channeling, by illustrating the split lines 180, 181 and their sequencing in time, before or after a stream has been transmitted, or even retransmitted wholly or partly to a third party.

The method according to the invention conceives a secured account 45, forming a box, capable of receiving a deposit, from the author, of instructions 182 such as instructions that can be delivered subsequently or information. It may also involve elements of identity, for example a true, cryptonymic or pseudonymic identity and elements of correspondence between certain of these identities. The box 45 is furnished with a lock device 50, which may be digital or analog, that can be activated by a multifunctional stamp forming a key. The recipient or recipients offering up said key to said lock, this key carrying a secret that opens the lock 50 acting as a cryptographic protocol for control of access to said secured account.

In one particular embodiment, on the one hand the stamp forming a key and on the other hand said lock are each in totality or in part the respondent of the other, either as a profile and counter-profile, or as an image and its negative, or as a die and its work, or as a scratch and its scar, this complementarity toward a whole or toward a succession generating capabilities for dialog, for correspondence, for reconstitution of the whole or of the filiation, for the purposes of validation, identification or authentication, of actuation of a signal or of a mechanism, of expression of a meaning or of instruction such as an instruction or an item of data, or of positive connection between them.

This stamp is placed by the author, by means of a marking system, in the computer or communication protocol 183 of a stream or of a file 1, which protocol can be likened to a container. This container and the content 184 being subjected to possible total or partial restrictions of access, of processing, of storage, or of transmission and retransmission, on the basis of the instructions obtained via the stamp from the secured account 45 or from the anonymization authority, or else on the basis of previous instructions corresponding to the simple noticing of presence of the stamp in a protocol by its recipient. At least one operating instruction dedicated to at least one recipient is transmitted or can be accessed by means of the stamp. Said operating instruction is for example an authorization, an interdiction, which may be total or partial and discriminated, the issuing of requests or of conditional clauses, the activation, the modification or the stopping of a function of a recipient.

The method generates a partitioning of data or of instructions of a temporal kind, in that:

- a portion of the split 181 can be made before its transmittal (pre-transmittal) with deposition of instructions 182 that can be placed by the author in his box 45 furnished with a lock 50 (secured electronic account) and managed by the anonymization authority;
- at least one other portion 180 can be carried out on receipt (post-transmittal) according to instructions that can be accessed from the anonymization authority or via the same lock 50, activated by the presentation of the stamp accompanying this transmission.

In addition to its temporal character, the partitioning with channeling is therefore also of a spatial kind, since it breaks up and optionally disperses the instructions between a stream or a file on the one hand and the box 45 on the other hand, or even moreover between several recipients, or else beyond the access of any recipient.

Figure 1C:
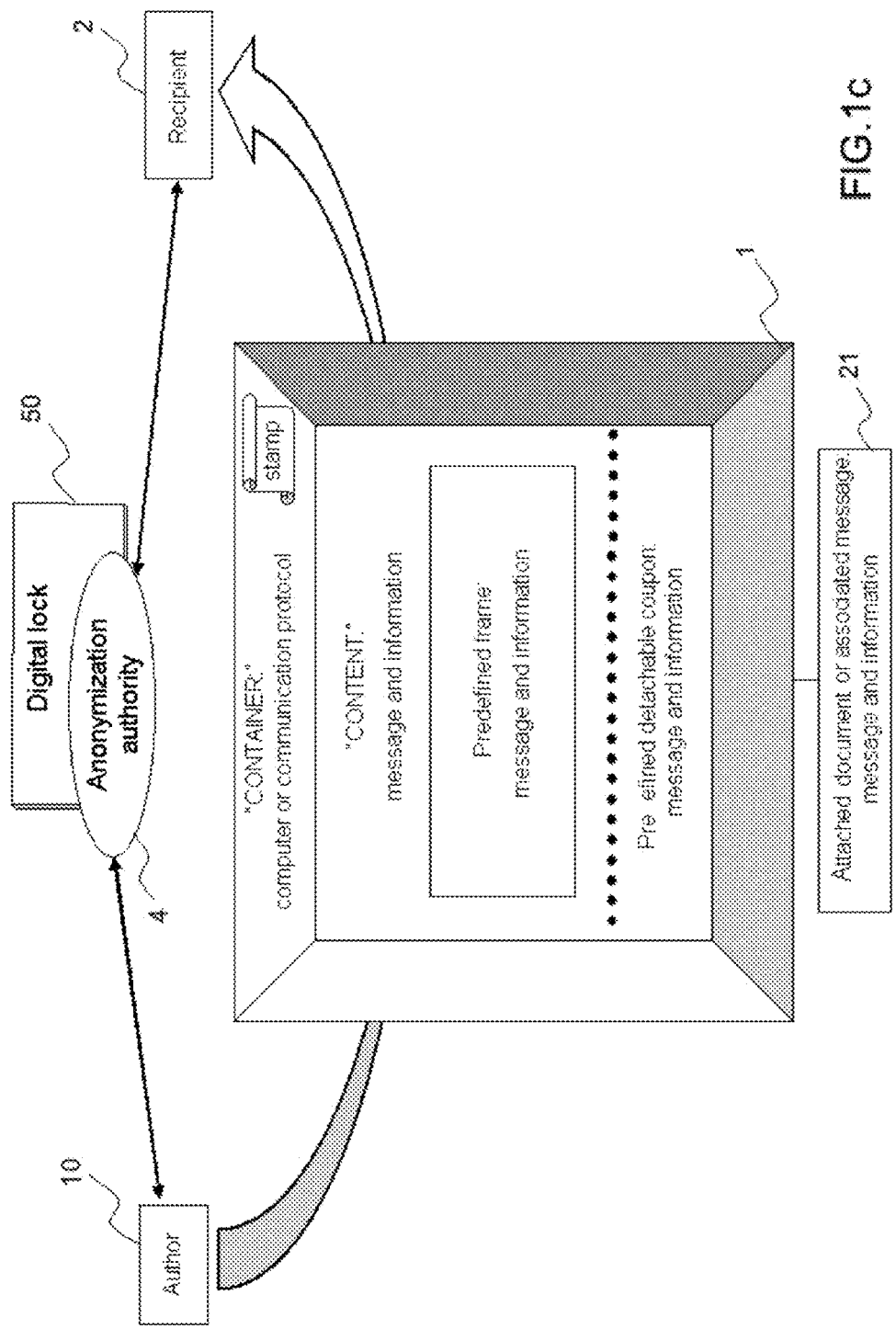
FIG. 1c, as an example of the various portions of a document in mail or file form.

FIG. 1*c* illustrates as an example the various portions of a mail or of a file 1 that can be assigned in the event for example of an interdiction or an order of reading, processing, recording or transmission intended for a recipient 2:

- a predeterminable portion of this protocol, such as the telecommunication identity of the author;
- optionally a predeterminable portion of the content, this portion being able to take the form for example of boxed elements or digital inserts in the mail or in the file, or else of segments of its content in the manner of a detachable coupon. The latter cases may give rise to a splitting of the mail or of the file;

another file 21 attached to a mail or a file.

Figure 2:
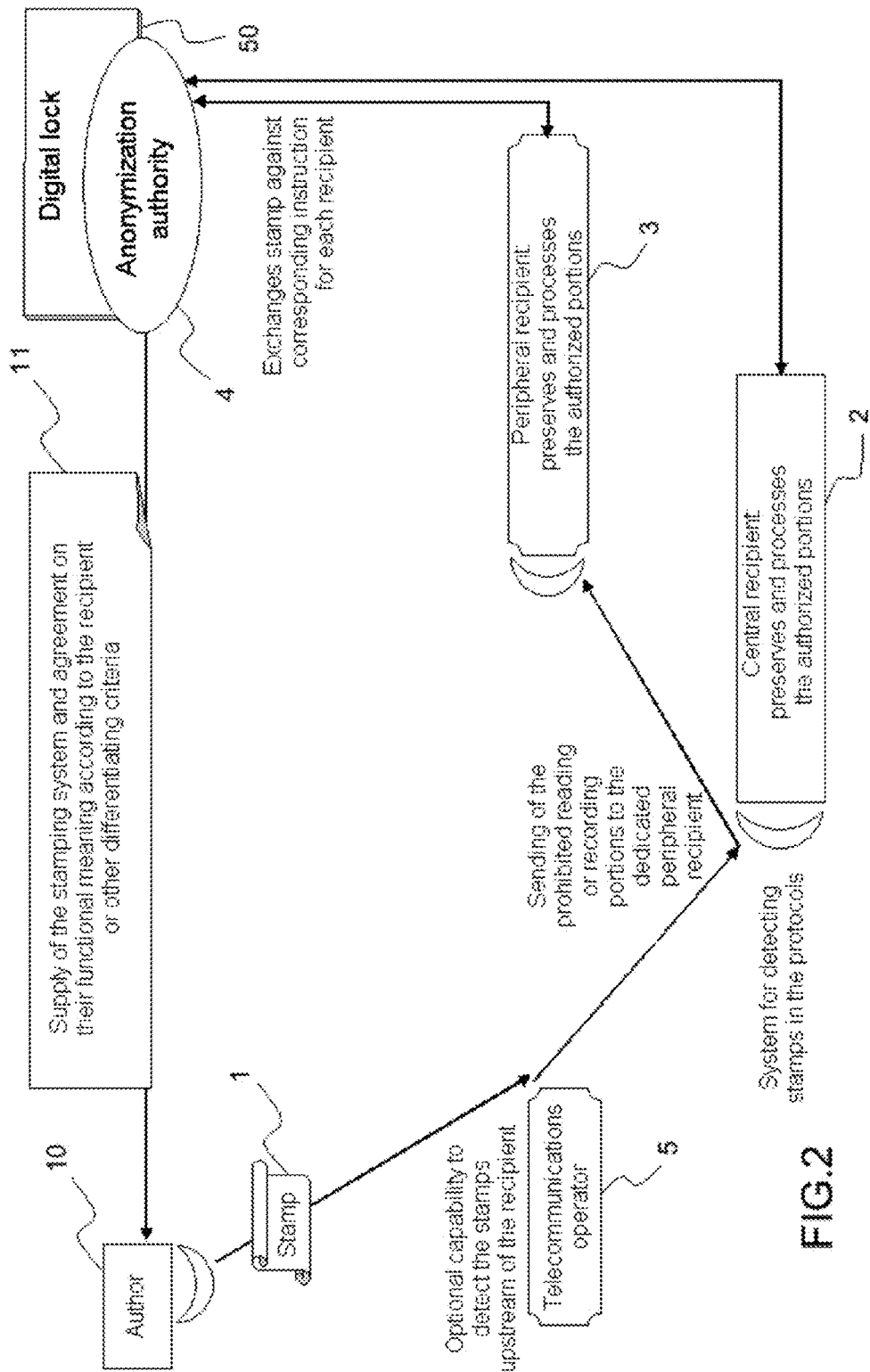
FIG. 2, the method for managing a file or a mail that bears a stamp transmitted by an author.
Figure 3:
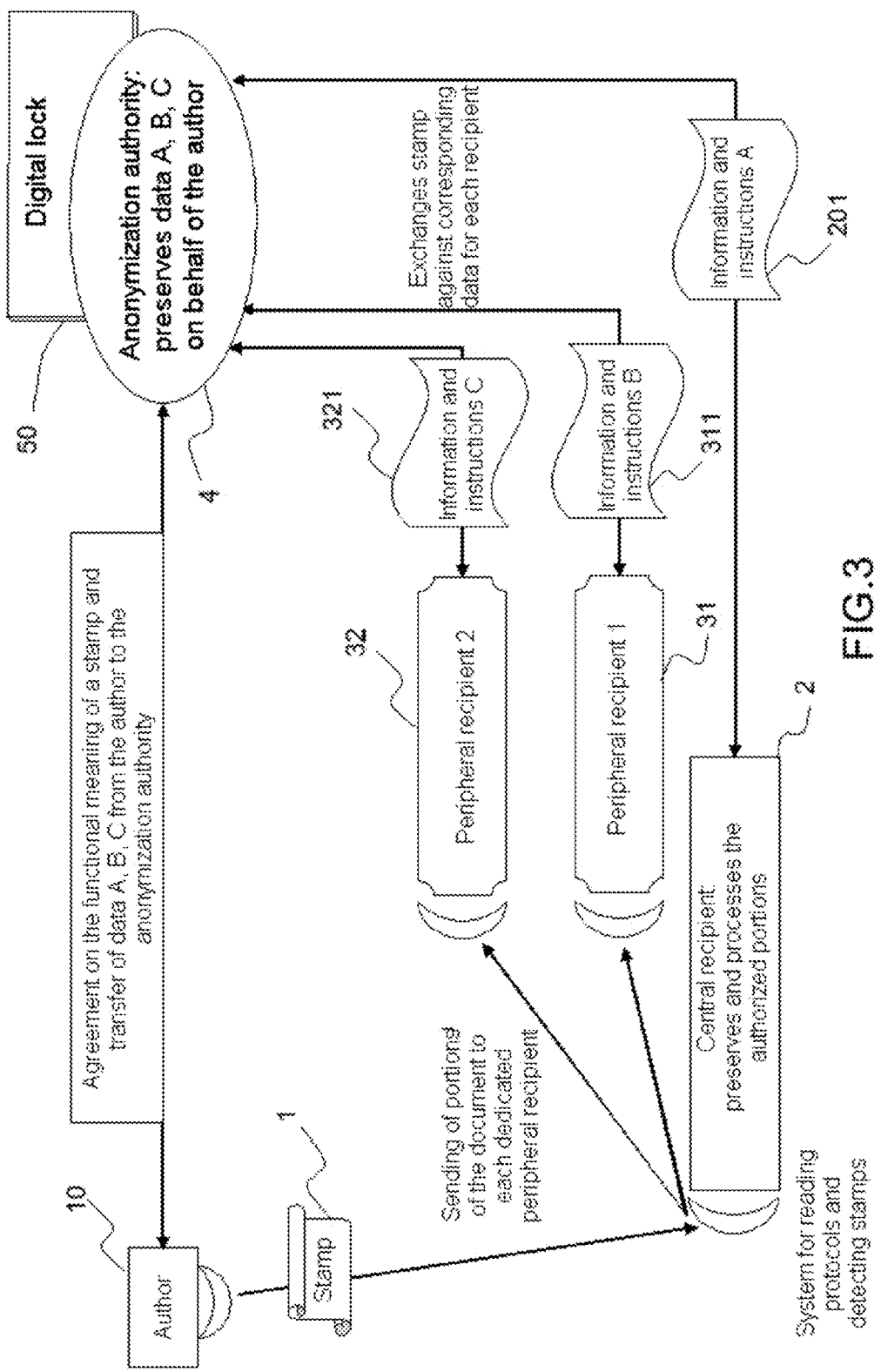
FIG. 3, the role of the passport endorsed by the stamp, in order to obtain other information or instructions than those that can be directly attached by a recipient to its presence in a protocol.

FIGS. 2 and 3 describe this distinctive sign called a stamp, its operation and its role. They are used to specify the difference between on the one hand the intrinsic functional value of this stamp and on the other hand its status as a passport for obtaining from third parties additional information or other instructions. The dichotomy between intrinsic meaning and passport emphasizes the broadening of the roles of this sign which is both distinctive and of recognition relative to patent application FR 2 932 043.

FIG. 2 illustrates the method for managing a document 1 or a mail carrying a stamp transmitted by an author 10, the method of interpretation of the latter and the functions corresponding to its presence. It details the use of the intrinsic functional meaning of this stamp, that is to say the fact that its presence corresponds per se to a function that can be initiated by a central recipient 2, a function that can be of interdiction or of authorization, of modification or of stopping of a given action such as reading, access, processing, recording or transmission.

As described in patent application FR 2 932 043, a device 11 managed by an anonymization authority 4 supplies the author 10 with a stamping system and a convention of use which agrees on the functional meaning of this stamp depending on the recipients or depending on other differentiating criteria.

Patent application FR 2 932 043 promoted the fact that the stamp inserted into the protocol is virtually monofunctional, centered on the principle of being able or unable to read certain data. From now on a wider variety of functions is allowed; functions of processing, of recording or transmission of each item of data. This broadening is enhanced by the fact that the stamp does not constantly correspond to the same instruction depending on its types of recipients or depending on other criteria such as calendar-related criteria. The result of this is a virtual infinity of variants, to the extent that each type of instruction can relate to a total or partial level.

In FIG. 2, one and the same stamp expresses to the central recipient 2 an interdiction of access to and of recording of a particular content, and then expresses an authorization to a peripheral recipient 3 which will receive it to follow.

Thus, for this peripheral recipient 3, the stamp will be an instruction to initiate the actions based on the information in this mail or this file, notably in the portion that optionally remains access-barred solely for the central recipient 2.

Either the recipient 2 or 3 straight away has knowledge of the functional meaning of the marking, or it requests it from the anonymization authority 4 or from the lock by presenting to it a copy of this stamp or of the protocol in its entirety. The authority or the lock transmits the correspondence between this stamp and the corresponding instruction to such a recipient, or such a type of recipient. There may therefore be several different instructions depending on the nature and the number of the recipients, or even a progressivity of delivery of these instructions.

Once the presence and interpretation of the stamp has been noted by a recipient 2 or 3 or any authorized reader, the corresponding functions can be activated.

In another embodiment, an interdiction of access, of reading, of processing or of recording may take the form of an immediate rejection of the documents, sections or spaces of incriminated information, so that they do not enter the computer system for example of the central recipient. The corresponding data will be either refused and have no intended recipient, or automatically directed to predetermined peripheral recipients 3. In an intermediate option, it may involve a buffer zone or a black box, independent of the computer system of the central recipient 2, and placed upstream, under or outside his control.

In another variant, the presence of the stamp will be noted higher upstream, for example at the level of the telecommunications operator 5 when the stream concerned passes through. By pre-established convention, the coexistence of this stamp with the indication of a particular pre-registered intended recipient, will automatically direct all or a predefined portion of the stream to a third party entity responsible for a delegated management, as a substitute of the central recipient. This routing being accompanied by optional tasks such as partial retention or amputation, agreed according to the general method of initial reception. However, except for the fact of inserting this operator, this variant would not fundamentally modify the general ordering since the central intended recipient would remain central because it would be using a simple right to the delegation, and because it would remain the intended recipient in the mind of the author and responsible for the correct completion of the process.

FIG. 3 details the passport role endorsed by the stamp in order to obtain other information or instructions than the functional ones that can be directly attached by a recipient to the management of the mail or of the file. It illustrates the respective play of the various recipients 2, 31, 32 and of the anonymization authorities or of the lock, between them and with respect to the data that are present inside or outside the mail or the file 1 governed by the stamp.

The variety of responses that an anonymization authority or the lock can deliver for the purpose of the stamping goes beyond the field in which patent application FR 2 932 043 placed itself. The latter was, excluding instructions, confined to information 201, 311, 321 that was often minimal, itself essentially linked to the identities only. The anonymization authority 4 or the lock can now deliver any type of instruction or information, such as an identity, a pseudonym, an address, an element of accounting or scientific computation, that is to say more generally any element lacking for the accomplishment of tasks and for the understanding of the processing to administer to them. As an example, it may involve a manner of decrypting such content and then of using it in the rules, and its general operating instructions. The anonymization authority 4 or the lock preserves the information and instructions 201, 311, 321 on behalf of the author 10.

The information or the instruction may vary there also depending on its types of recipients or depending on other criteria such as calendar criteria.

When it is received by the recipients 31, 32, the stamp inserted into the protocol, and optionally all or part of these data remaining unknown in the mail or file, are used:

either as a means of access to an instruction for initiating actions based on the information that is both present in this mail or this file, added to other information already in the possession of the recipient and at its sole discretion, the latter is called internal information;

or simultaneously as a means of access to an instruction or as a means of obtaining or of activating other information called external information. The latter, such as a postal address, will be obtained either:

by other means than the mail or file, and drawn from external sources such as the anonymization authority or the lock, it may be obtained notably from the stamp that is present in the protocol;

by another mail reaching the peripheral recipient directly, which mail is activated directly or not by the author.

Internal or external information is not necessary to accomplish the proposed task or to complete the accomplishment of this task, or necessary for the correct management of a relationship with the author.

The peripheral recipients 31, 32 or the central recipient 2 may act in the same manner with the optional portion of the mail or file on which they have had the right to act, mixed also with internal or external information.

At a more conceptual level, and with the term "unknown" being able to be extended to mean inaccessible, illegible, undecipherable, incomprehensible or unexpressive, it may therefore involve:

- placing unknown information in relation with another item of unknown information: like the example of a distinctive sign referring to another secret or arbitrary code, in the case of a dialog between the anonymization authority or the lock and a bank-card group knowing a client through a personal number;
- placing unknown information in relation with an item of known information, like the example of the stamp with a patronymic;
- the option of placing the known information in relation with another known item of information, without being excluded in all points, has weaknesses with respect to the objective of securing the process, which would restrict the use thereof. It may involve referring to a patronymic with a postal address.

FIG. 4 illustrates the case of a static document 41 that is present for example on a computer, where a stamp 53 is inserted into its computer protocol. The author, the holder, the depositary or the manager 43 of this document 41 may on the one hand place the stamp 53 in the protocol, and on the other hand deposit the meaning of this stamp with the anonymization authority 4 or for example with a digital box 45 protected by a lock.

A visitor 44 wanting to access this document for the purposes of knowledge, processing, transmission or recording, must, because of the presence of the stamp 53, previously obtain its meaning either from the anonymization authority 4 or from the digital box 45.

The meaning will have been able to be broadcast in advance, or correspond to a signage element that is known and that refers to instructions that have themselves been broadcast.

The meaning may optionally be accessible directly from the author who has transmitted the stamp. This, through its risk of repeated intrusion or through the loss of possible anonymity which may result therefrom is of real value only in limited cases such as mainly intra-company or even inter-company activities where direct relationships between colleagues and with no anonymity are usual.

Figure 5A:
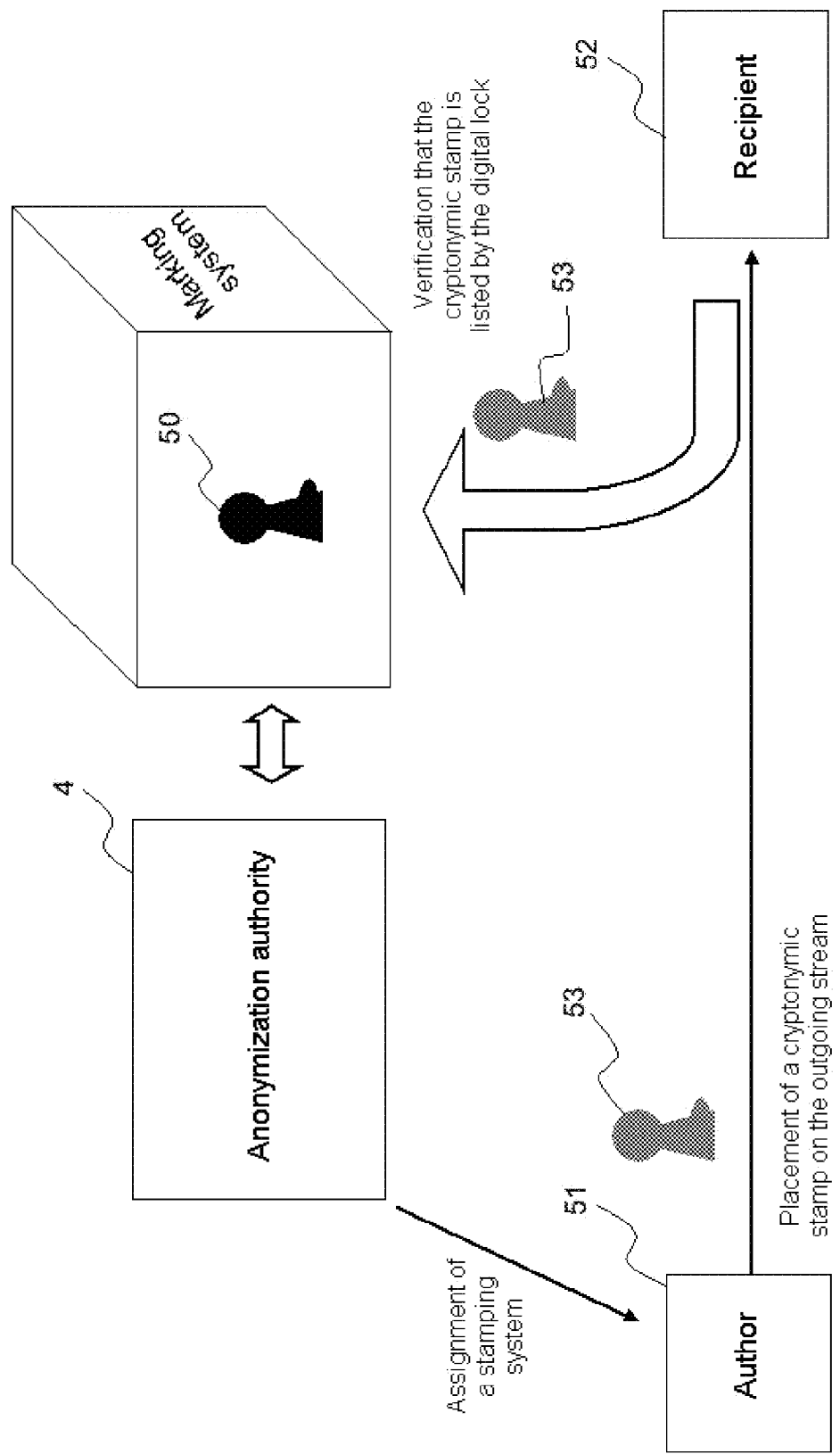
FIG. 5a, an example of verification of a cryptonymic stamp with a lock.

FIG. 5a illustrates the verification of the stamp with the lock 50. The anonymization authority 4 serves as an interface with the user of the stamps, the author 51 of the stream or the holder of the file, by granting him the stamping systems, by agreeing a stable pseudonym linked to the successive cryptonyms, and by knowing him by his real identity.

The lock 50 receives, as a minimum, information on the stamps of the author. It makes it possible to validate the reality, the authenticity, the actuality of a stamp 53 presented to it by a recipient 52 of a transmittal bearing such a sign 53. The stamp 53 is then likened to a physical key that a person would try to insert into a physical lock merely to verify that they match, and to check that the transverse profile of the key, like an image with its specific grooves, correctly corresponds to the cutout of the entrance orifice of the lock, and therefore verify whether it can or cannot enter this housing. This is so without it being necessary to turn it once it is inside.

The recipient and verifier may however collect other items of information by the insertion of the key into this lock. This collection is made mechanically by a marking system in which a stamp inserted into a lock comes out again with the additional imprint of a second item of information. This, in the same manner as a physical key that is uncut in its longitudinal direction can be inserted into a lock and be marked on the inside by chalk or paint previously sprayed onto the internal fittings, with a contour defining this profile that is sought. Or in this instance, by transposition of a contour delineating the pseudonym corresponding to the cryptonym. This mechanism can be used both for ascertaining for example the portion that remains inaccessible of the computer or communication protocol or else any other instruction, item of information, secret or signal. Currently, no actuation of the lock occurs, but simply the placing of an informing imprint on, with or in a previous imprint serving as a key occurs. This placement follows the verification of a match between this key and this lock when they are placed in relation.

Figure 5B:
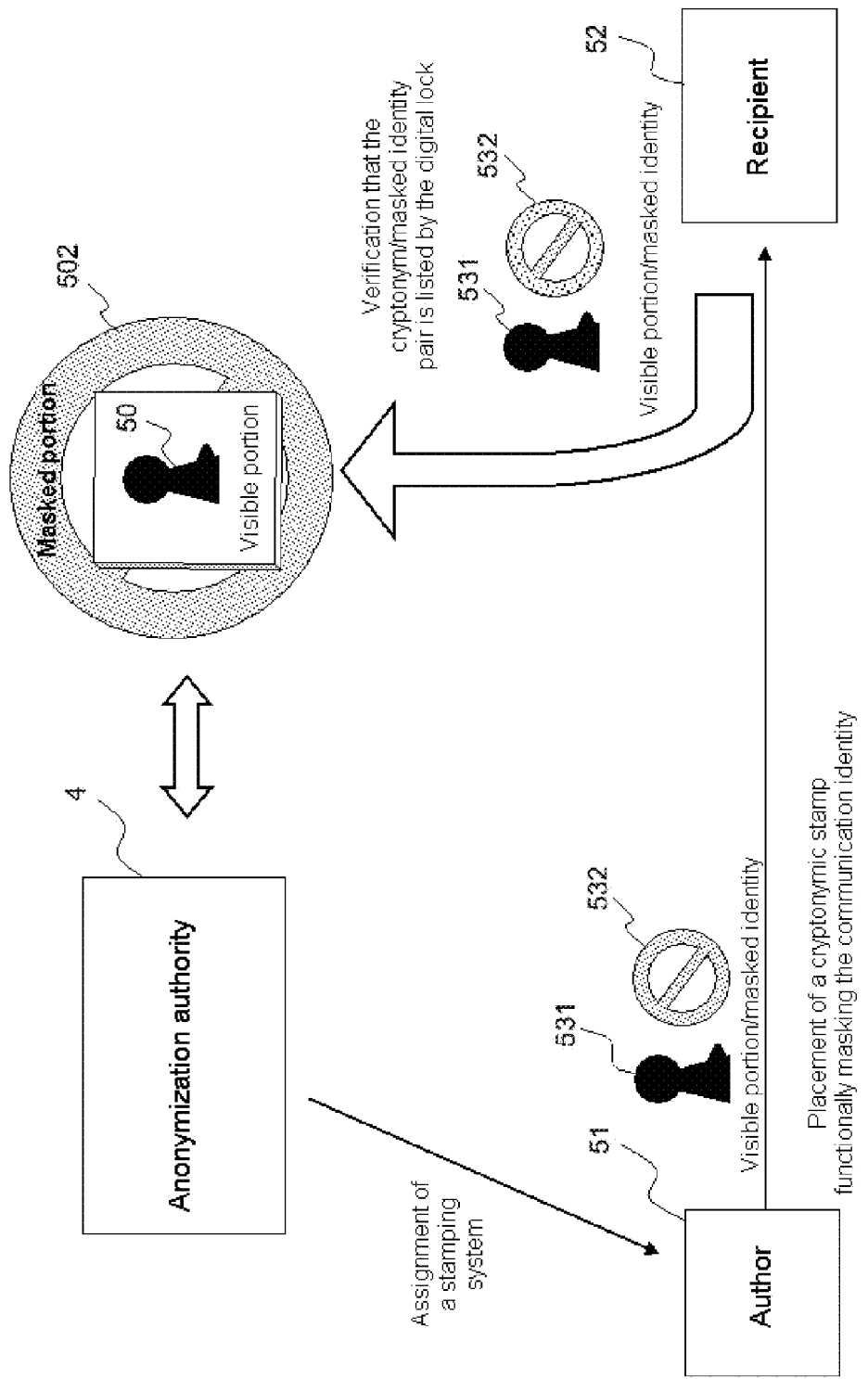
FIG. 5b, a mode of confirmation with the lock that the cryptonymic stamp actually belongs to its homologated sender.

FIG. 5b shows a particular use of the lock of confirmation with it that the stamp really belongs to its homologated author. It is not yet currently desired to open a box, an access, an antechamber or to actuate another mechanism and only the correct operation of this lock will be per se an item of pertinent information.

The lock 50 will know the telecommunication coordinates or identity of an author and if necessary his pseudonym. These communication coordinates corresponding to what appears in the complete protocol of one of his transmittals.

The action will consist in inserting the key, then in trying to have the key turn the lock. In this instance it will be considered that the longitudinal profile of the key has been able to stay hidden from the recipient 52, in parallel with the fact that it will not have access to the internal morphology of the barrel 502, with in particular the length of the pins or the position of the internal fittings. By transposition, the hidden longitudinal profile of the key corresponds in this instance to the portion that remains functionally access-barred 532 within the computer or communication protocol, and the internal morphology of the barrel corresponds to this same portion as known and transmitted to the lock by the anonymization authority 4.

This use serves notably to confirm with the recipient and verifier, in the case of established correspondence between the functionally access-barred portion 532 and the internal morphology of the barrel 502, that the visible portion or accessible portion 531 for him in the protocol is indeed coupled to the portion 532 that has remained invisible or inaccessible to him. That is to say for example confirming to this recipient that a particular stamp of which it has knowledge is indeed coupled to the communication identity that accompanies it, such that the anonymization authority 4 recognizes them to be linked.

Figure 5C:
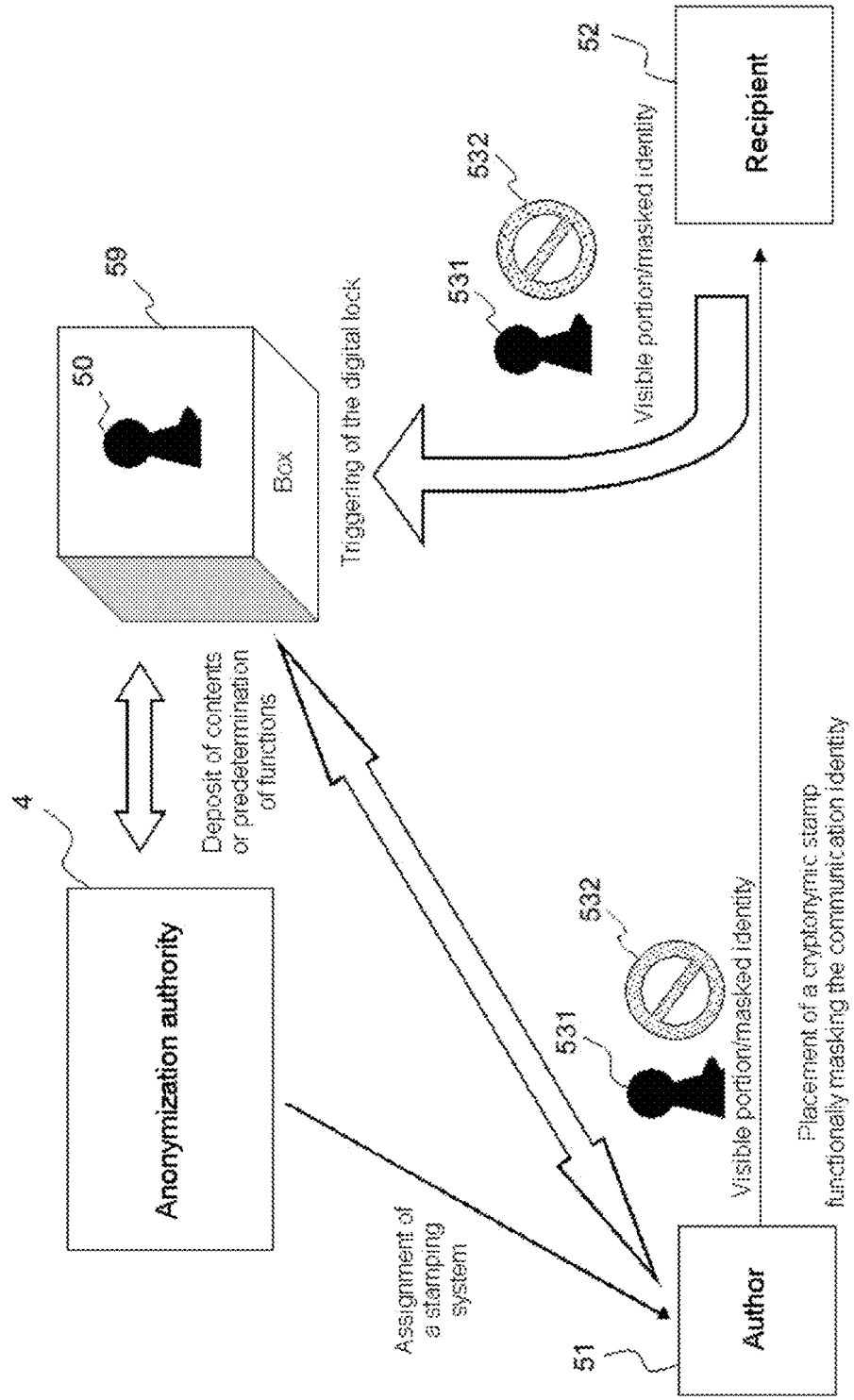
FIG. 5c, a mode of opening the lock by the stamp forming the key and the obtaining of contents placed in the box or the activation of functions.

FIG. 5c shows an assignment in which the lock serves for all current usages of a lock, such as notably actuating a mechanism or a signal, authorizing or forbidding access, opening an antechamber or a box 59 in order to gain access to its content.

This function may relate equally to an automatic procedure that is independent of the will of this user, and to a configuration in which he may for example choose what he needs from a box previously filled with various data by the author and optionally by the anonymization authority. This box 59 can be personalized and reserved for the access of a single, predesignated intended recipient, and to be accessible to several or all of the possible intended recipients. This box can be likened also to a furniture storehouse, in the event that the author chooses to be his own intended recipient. Access to the box can be conditional upon all forms of suspensive constraints or conditions, such as opening only after a determined date.

The content that the recipient can collect via this lock and by the opening of a digital box 59 is not a priori limited: it may involve identity attributes, the pseudonym of the author and any item of data, instruction, informative or initiating signal, provided only that it has been deposited therein by or with the assent either of the author or of the anonymization authority or of third parties approved by them according to the various charters of use that can be envisaged. In the cases in which it is not a box but another type of device such as an antechamber or a mechanism, their configuration and their operation will be adjusted again either by the author or by the anonymization authority.

The function usually devolved to a trusted third party is in this instance subdivided between an anonymization authority 4 and this lock 50. This lock can be a single and autonomous entity serving as a counter. It may have other configurations, up to being installed with the recipient 52, like for example a black box receiving the streams as a priority. In this latter case, the actualization of the data relating to the variant stamps or else the stamps contained in the digital box will be carried out through either a central point managing these decentralized digital locks, or via the anonymization authority, or via a mixture of the two. The concept of central point does not imply its immutability or its unique character.

In a variant, the recipient and verifier can be obliged, in order to be able to verify a stamp forming a cryptonym with the lock 50, to make use of an identification or authentification system itself that indicates it to be the known and authorized recipient.

Figure 6:
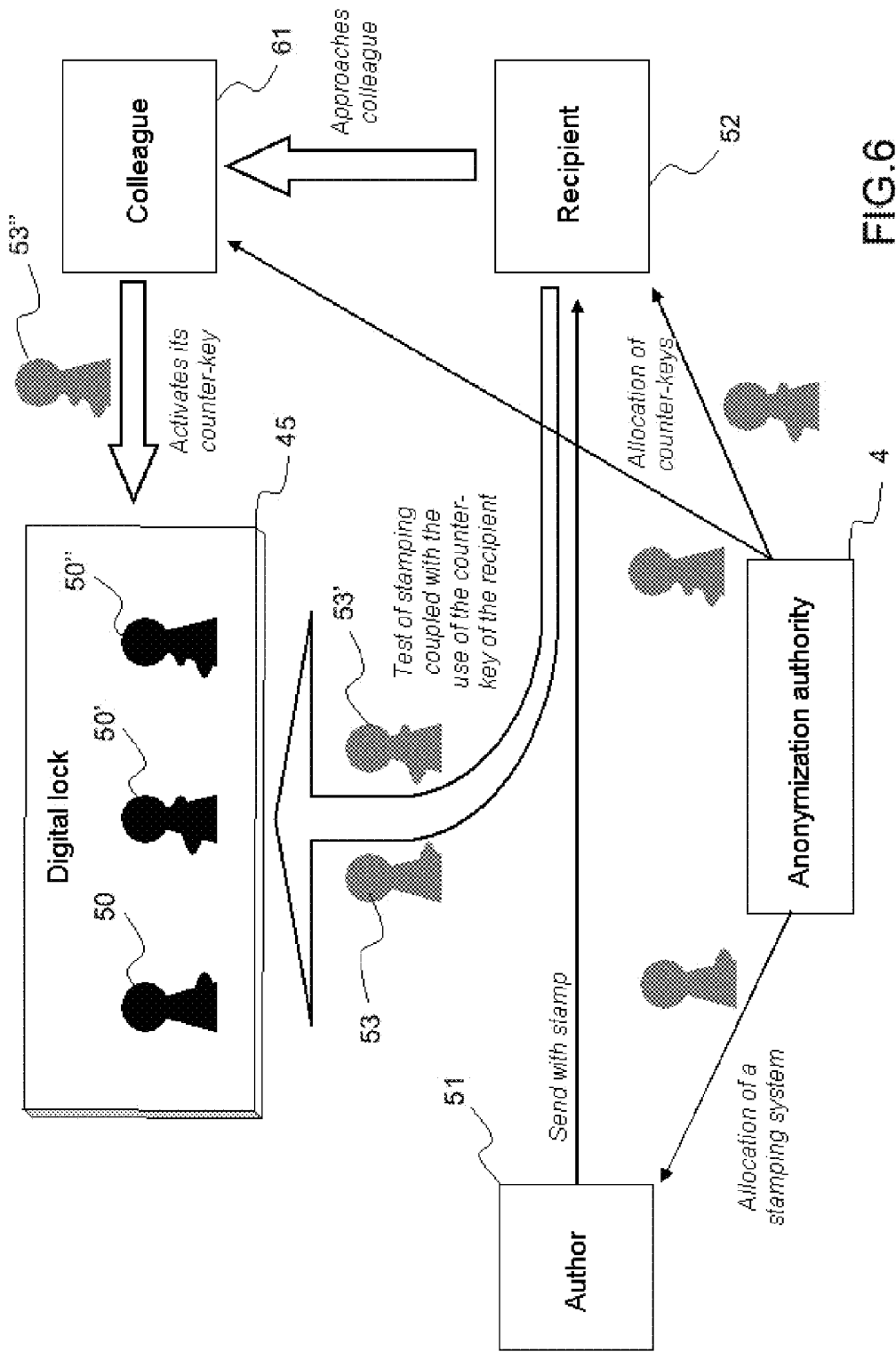
FIG. 6, an example of use of a stamp forming a digital key and requiring the use of counter-keys.

FIG. 6 illustrates an example of use of a digital key requiring the use of counter-keys. An author 51 has a document, or transmits a mail, with a stamp 53.

A given box 45 is furnished with a lock 50 matching the stamp 53 inserted into the protocol, and a second lock 50' corresponding to a mark 53' granted to a recipient 52 or to a delegated authority. This recipient 52 or its delegate may open the box or, in order to actuate the first lock 50, must make use simultaneously of the stamp 53 discovered in the protocol, called a key, and its own mark 53' called the counter-key.

The number of locks is not limited and other counter-keys 53", corresponding to other locks 50", may be allocated to the recipient, or to a third party such as one of his colleagues 61, or even to the author who placed the initial stamp.

The entity 4 which may or may not grant, transmits and broadcasts the keys and the counter-keys is an anonymization authority. Advantageously, this may be an entity dedicated to this function. This may be a plural of entities. An anonymization authority may itself be the holder of a counter-key for such a box.

Figure 7:
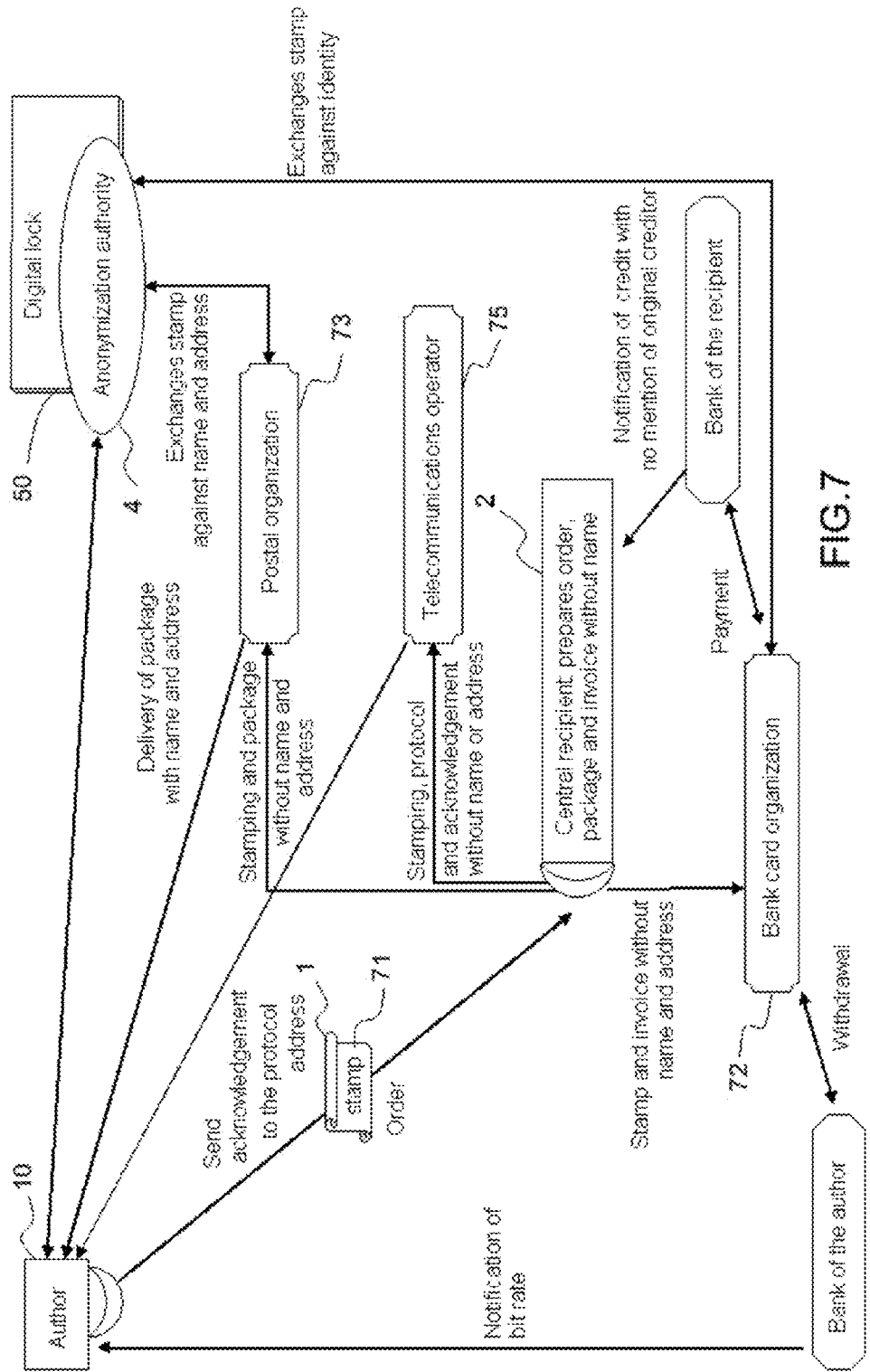
FIG. 7, the possible steps of a method according to the invention applied to an order placed on an online trading site.

FIG. 7 shows the major possible steps of a method according to the invention applied as an example to a central recipient 2 having received an order 1 emanating from a client in the context of an online purchase for example on the Internet. Their relationship based on a desire for the protection of various identity attributes of the client will result, with the manager of the web site, in him functionally barring for example the learning and the retention and archiving or processing of the contained data.

This recipient 2 will prepare the package and the invoice but will know neither the name of the buyer nor his bank references, nor his postal address for dispatching the package. His knowledge will be reduced to:
  the existence of a stamp 71 inserted into the protocol, having furthermore functionally barred him from gaining access notably to the telecommunication coordinates of the author;
  the nature and the detail of the order.

Based on his tariffs corresponding to this order, he will issue an invoice but it will still not have the name of the person to be debited.

A copy of the stamp will be addressed by him to a bank card group 72 accompanied by the nameless invoice. This sign of recognition will allow the group to determine the identity of the person to be debited which must be added thereto, and to make the corresponding financial withdrawal.

The same stamp will be addressed to a postal administration 73, accompanied by the package without the recipient's name. This sign will allow the postman to add the corresponding physical name and address.

In both cases, these peripheral recipients which are a bank card group 72 or a postal administration 73 will require or will have received in parallel transmission of the equivalence between such a stamp and such peripheral information left to their sole discretion. This parallel or sequential provision may result either from a communication made directly for their attention by the author 10, or, in a more rational organization mode, by the anonymization authority 4 which will centralize the management of the equivalences or via the lock. One or the other will cooperate with the peripheral recipients 72, 73 by transmitting to them the equivalence between a stamp 71 and a real identity or other one-off attribute of a person.

This peripheral recipient,
  in the case of a bank card group 72, will usually already know the bank references associated with the identity of its client;
  in the case of a postal administration 73, usually ignorant of the domiciliary references of the person, the anonymization authority or the lock will be able to hold them and transmit them to him in addition to any other address that is not domiciliary and is left to the choice of the author. The latter address will be able to be that of the beneficiary of a purchase of flowers or of an item of jewelry to be delivered by a third party, when it is desired that the merchant knows neither the buyer nor the beneficiary.

The number of peripheral recipients is not limited, and the above example can be fleshed out. For example, a telecommunications operator 75 is capable of being activated to route a response to the author 10, by adding his Internet address to a label originating from the central recipient 2. This device also works if the author of the mail or of the visit should become at a later time a beneficiary for example of a download or for any other receipt.

The information and instructions that can be transmitted via the anonymization authority 4 or the lock are not a priori limited. These may involve not only an identity attribute such as a postal address, but also details concerning the desired methods of dispatch, concerning the type of packaging desired or any other request.

In a variant, and in order to limit the power of action or of autonomous decision left to the peripheral recipients, it is possible to envisage that these peripheral items of information be themselves incomplete or insufficient to understand or accomplish the planned task without the further receipt:
  either of a visible portion of the container or of the content of the mail, transmitted by the central recipient;
  or of a portion of this mail, which is invisible to the only central recipient but able to be transmitted by it;

or finally of an addition of the visible and invisible portions that can optionally be present both in the content and in the container.

In the rest of the process, and for the purposes of supplementing the anonymization, the peripheral recipient in charge of the financial withdrawal from the account of the author can serve as an intermediate account at the time of the payment to the central recipient.

Similarly, a postal administration can carry out the same good offices of intermediation for an acknowledgement.

Figure 8:
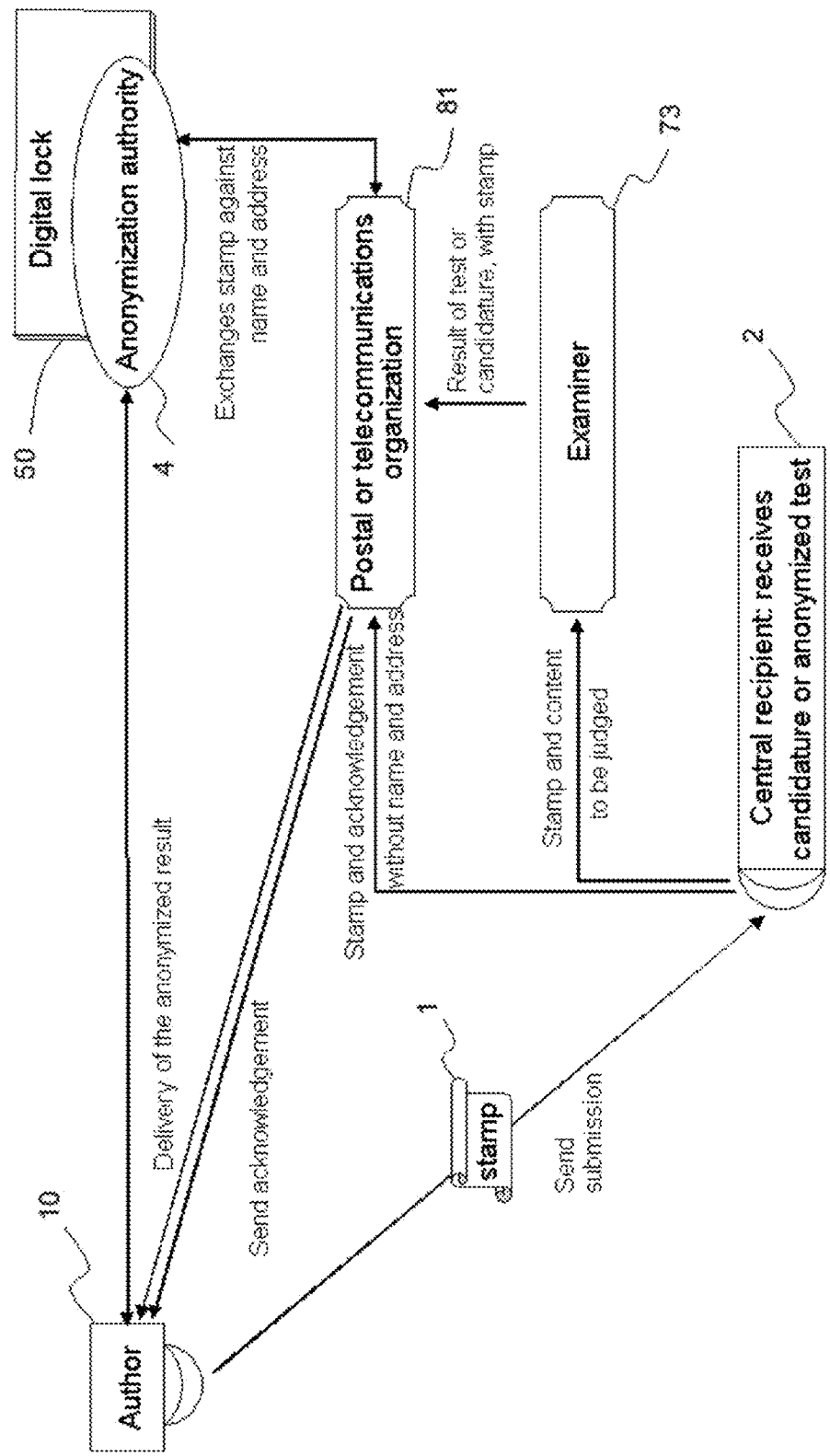
FIG. 8, the case of an anonymized response to a candidature which is itself anonymized, or a marking of a test carried out on line.

FIG. 8 shows the possible steps of an anonymized response to a candidature which is itself anonymized, or to a score for a test taken online, since the various tasks cited in the latter are capable of raising the same desires for confidentiality or intimacy in the return direction. This configuration may also chronologically follow that of FIG. 7.

The central recipient 2 receives the submission 1 without being able to access the content, automatically transmitted to a peripheral recipient 73 who does not know the author thereof. The score or response is then transmitted by means either of the central recipient 2 if he has the right to know the author, or more advantageously to enhance the anonymization through a third party 81 to whom he addresses the stamp and the score or response. This third party obtains the coordinates of the author from the anonymization authority 4 or via the lock and sends him the response without details concerning the party that has formulated it.

Figure 9:
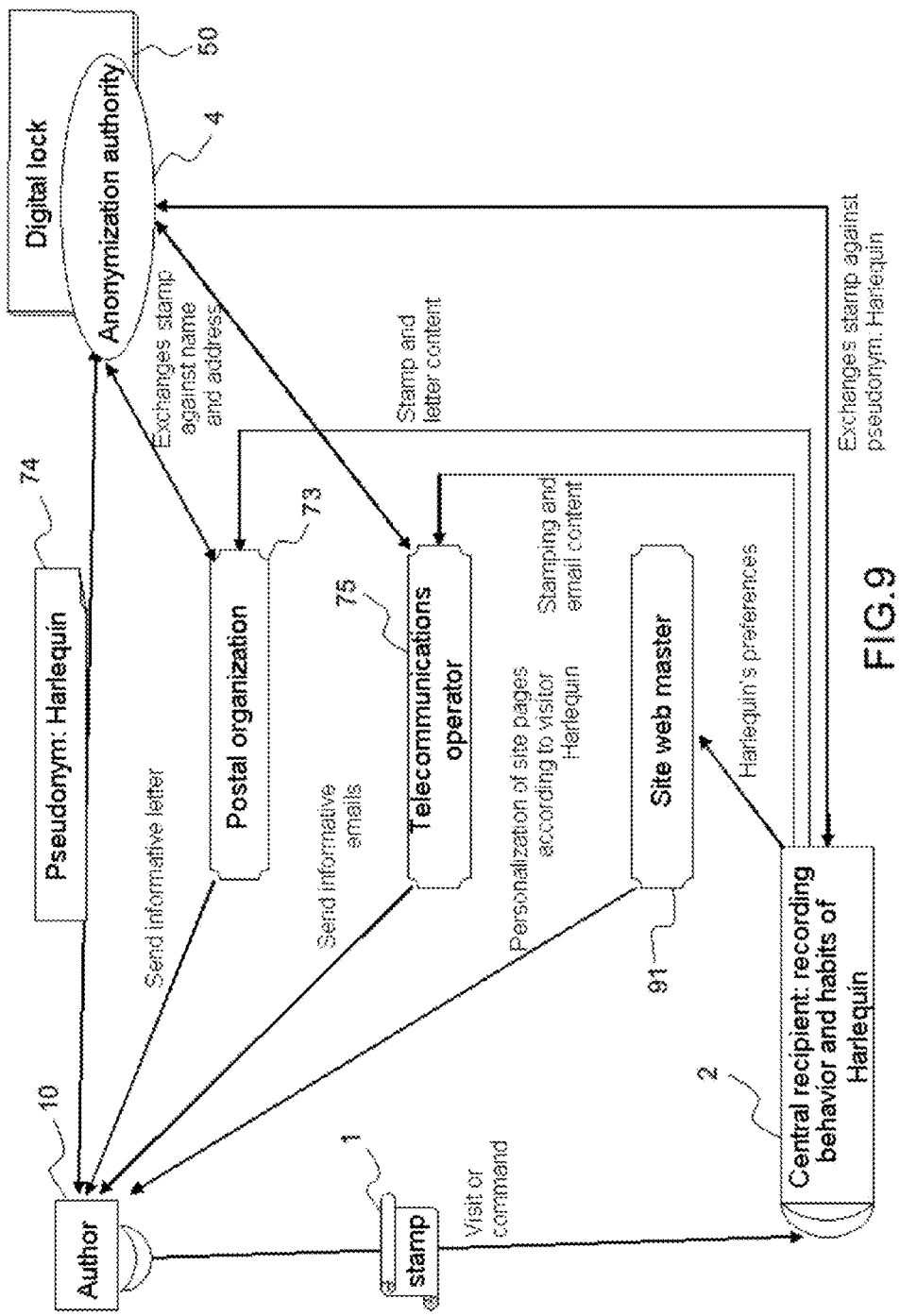
FIG. 9, the maintenance of a relationship to the consumer and to the user, and the capitalization of knowledge via a behavioral profiling.

FIG. 9 shows the possible steps that allow a data recipient, such as an electronic trading site 2 to carry out a portion of its activities of good knowledge or of profiling of its consumers or visitors, but via an anonymization form which does not disrupt it on its useful portion. All that is abolished is the portion that intrudes upon personal intimacy, which consists in knowing them this time by name. Which intrusive portion has the defect of often being dissuasive for certain purchases or certain visits. In future, knowing and recognizing a regular visitor under the dedicated pseudonym of Harlequin 74, for example, will in virtually all cases be no less effective than under his real name, in order to offer him services or advantages based on his behavior or his situation in the past. The method according to the invention furthermore adds to this anonymity that is guaranteed to the visitor a similar impossibility of connecting his behavior to the invoicing for the buyer, via the peripheral bank recipients.

A recipient noticing the presence of a stamp 71 on a mail, will obtain its equivalence in the form of the pseudonym of the author, such as Harlequin. The pseudonym 74 is invariant, while the stamp 71 is variant, capable of having changed since the last mail. The anonymization authority 4 or the lock is capable of connecting this series of stamps to their stable pseudonym.

The main recipient 2 is therefore capable of linking the present visit or request of the author to his past and to the observations made previously. In the case of an analysis laboratory for example, this may involve measuring the change in a health factor. In the case of a website, it may involve having listed his purchases, preferences, centers of interest, and his rights or duties such as a loyalty discount. This recipient 2 may also send mails to this author without knowing his real identity, and going through peripheral recipients 73, 75 who will obtain these confidential data via the anonymization authority 4 or the lock on presentation of the stamp.

Similarly, the central recipient 2 will be able to personalize, for example via a webmaster 91, the visited page, by configuring it according to this knowledge of Harlequin's past.

Figure 10:
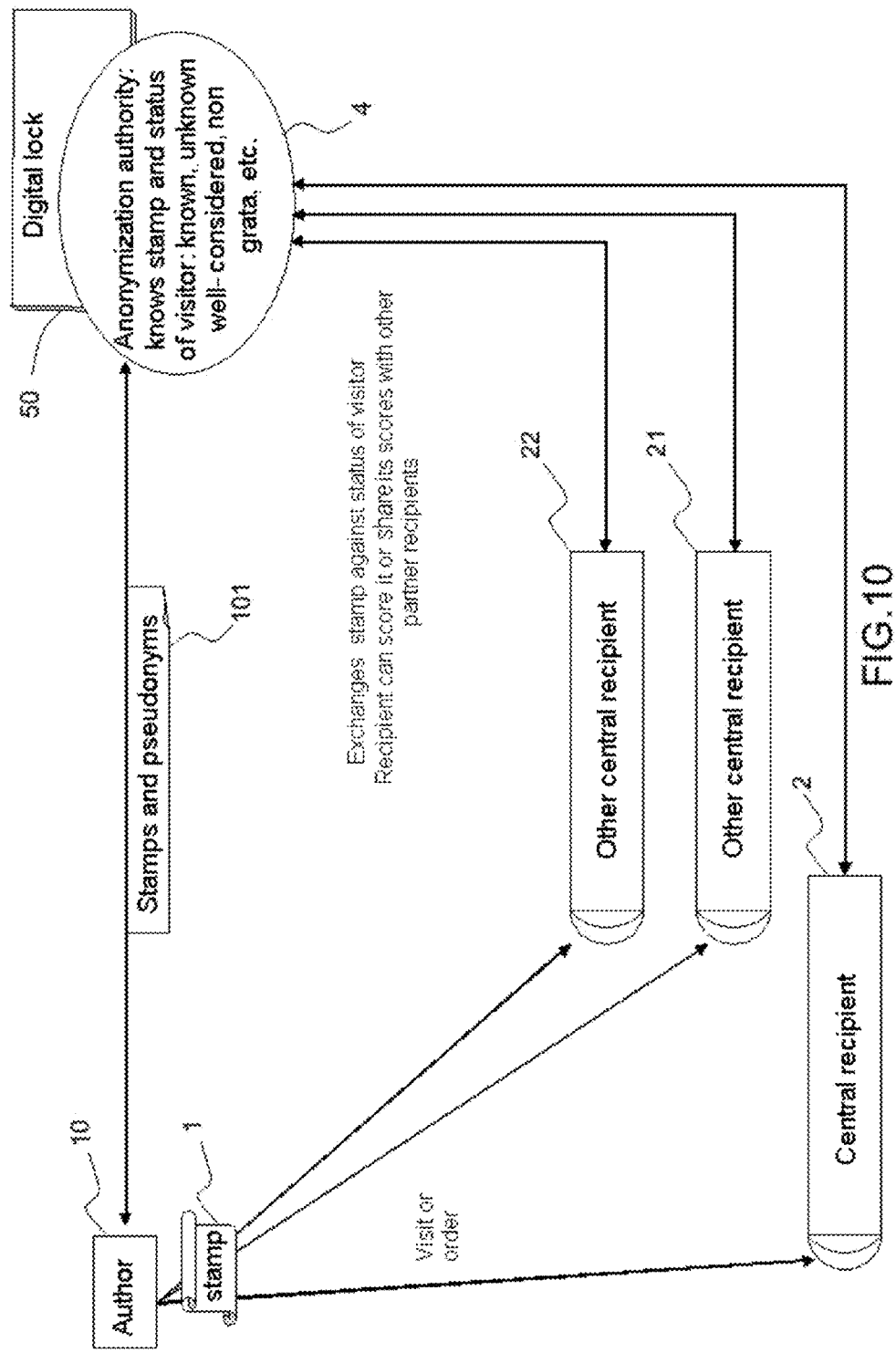
FIG. 10, another mode of deployment of the profiling, in an option in which the accumulation of detailed behavioral information gives place to more general classifications.

FIG. 10 shows a variant providing a restriction to the principle of recognizing without knowing, shown by FIG. 9. A variant that is possible when it is accepted by all the protagonists and authorizes several simultaneous or successive pseudonyms for one and the same author. This arbitration in which one or more stamps referring to a plurality of pseudonyms are all connected to one and the same identity by a tree structure or form aliases in a single chain would reinforce the secret that surrounds it, to the benefit of the author but to the informative detriment of the recipient. This may be included in a system of a la carte pseudonyms just as a la carte identities or degrees of protection and a la carte security exist and may correspond to an expectation of the author that can be supported by the recipient.

In this configuration, the central recipient 2 will not know the link that exists between the various pseudonyms of one and the same interlocutor, but will retain the guarantee that under his multiple appearances he remains homologated by the authority 4 granting the pseudonyms. Homologation capable of being based on selective criteria that are themselves known to the recipient 2, these criteria being capable of keeping an interlocutor as a persona grata or a person benefitting from advantages.

As an extension, the recipient 2 could indicate to the authority 4 that it in future should consider such interlocutor to be a persona non grata, irrespective of his pseudonym at the time, and thus proscribe him in future when there is a mail or a visit from him. The barring could possibly be more absolute through a mechanism for broadening the scope of the sanction to other recipients 21, 22 that have accepted the principle of this decision-making community for approval, scoring, banishing or quarantine. For example, a bank which might consider that a veto issued by a bank card group against a person automatically applies to it also, at least as a safety measure.

Preferably, this variant can be deployed according to a mode in which the author 10 can initially but definitively choose the one of its pseudonyms that it desires in order to make an approach to a particular recipient 2, 21, 22. Thereafter, it will keep this pseudonym for its subsequent mails. In this way, two different recipients could not know that Harlequin, with one of them, and Pierrot, with the other, correspond to the same author, while knowing that their holder corresponds under these two labels to their accepted behavioral code. Similarly, through a partnership effect for example between electronic trading sites, the loyalty of a visitor to two sites could come out with two discounts calculated on the addition of his purchases with each one. One of the values of this formula is a limitation in the crossing of files beyond what is sufficient for the good relationship with the consumer.

The option in which the author can choose different pseudonyms for communicating with one and the same interlocutor could be the subject of a rejection coming from commercial partners.

It is however envisageable in the case in which the interchange relates for example to an expression of thought, such as a regular political chat room visitor, who occasionally wishes to dispense with his usual pseudonym by which his interlocutors know him, in order to express an occasional less orthodox point of view.

Advantageously, and in order to limit the inappropriate information interchanges, the anonymization authority 4, or the lock via a deposit and recording mechanism, can serve as a centralizing point for the scores, assessments or quotations coming from various recipients and concerning one and the same author irrespective of the pseudonym 101 under which he is initially labeled. This anonymization authority 4 or the lock will distribute these judgments to the other recipients either at their request on sight of the transmitted stamp, or in a more automated manner according to a charter of use that can be predefined.

Figure 11:
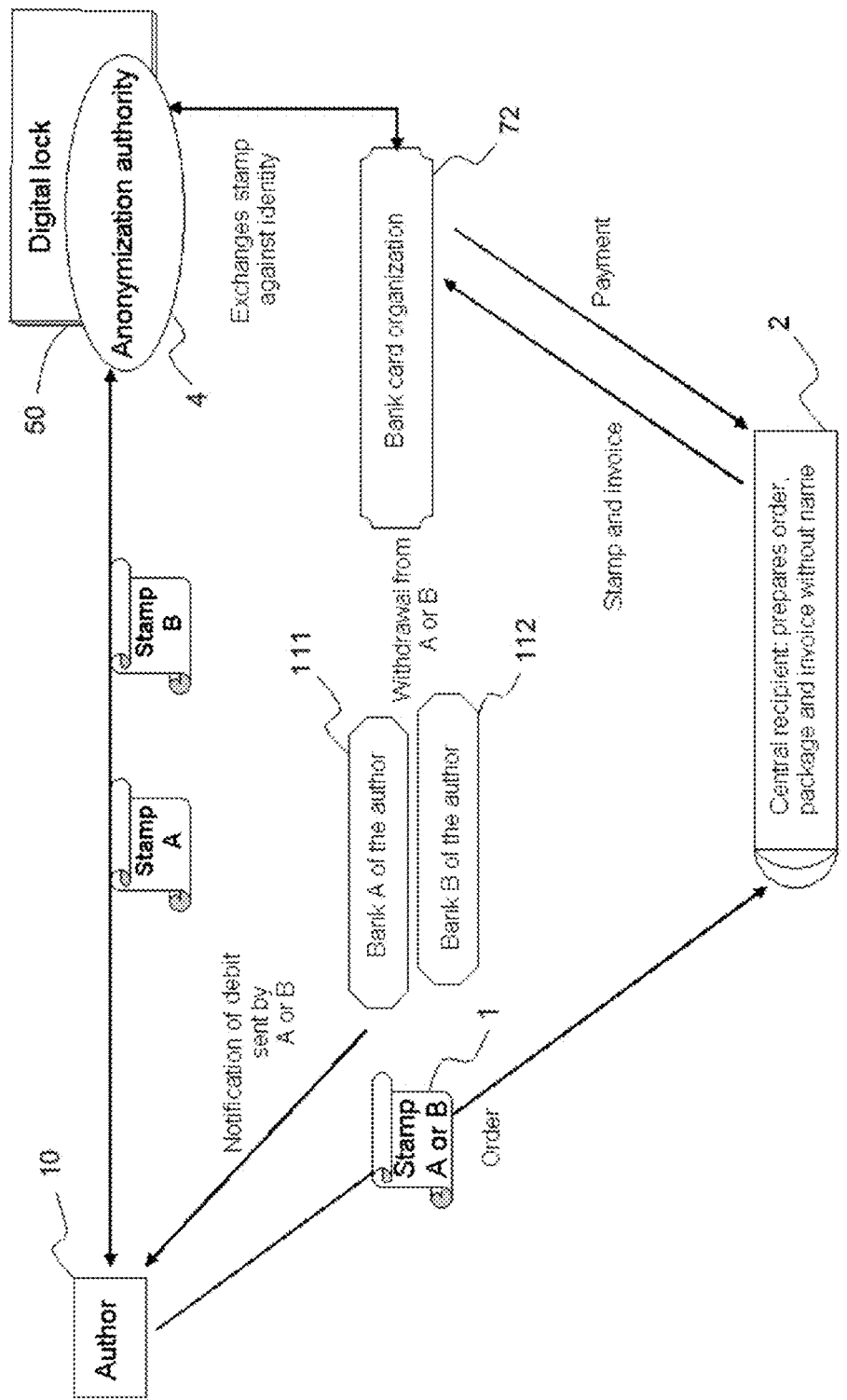
FIG. 11, a configuration in which one and the same person simultaneously has several different stamps that can be used at his choice or according to predefinable procedures.

FIG. 11 shows a configuration in which one and the same author 10 can simultaneously have several different stamps A, B that can be used as he chooses or according to predefinable procedures.

This adaptive character may also relate to the fact of pre-registering several bank accounts 111, 112 or several payment cards or else, for example, several addresses and more generally all attributes.

Each pre-registration giving rise to attribution not only of a stamp A, B but of a relation of this distinctive sign, since the latter is variant.

This plurality of choice offering the possibility of preferably making one more activatable than the other depending on charters of use that are predefined and can be updated if necessary, a charter linking the author 10 to the anonymization authority 4, which will from then on transmit the corresponding information to a recipient 72.

A variant consists for example in a mail to a recipient 2 being coupled with a copy with a one-off instruction to the anonymization authority 4 or under lock. This less simple formula would be envisagable mainly for situations linked to reservations, conditional clauses, suspensive clauses or moratorial clauses, confirmations or validations to come, such as a final choice of account to be debited made after verification of the assets actually available in the various accounts of the author. This can be envisaged also for cases of subsequent validation of a choice which the author legally has the right to change, or when he is waiting for the actual delivery of a product or of a service in order to assess its real quality.

Figure 12:
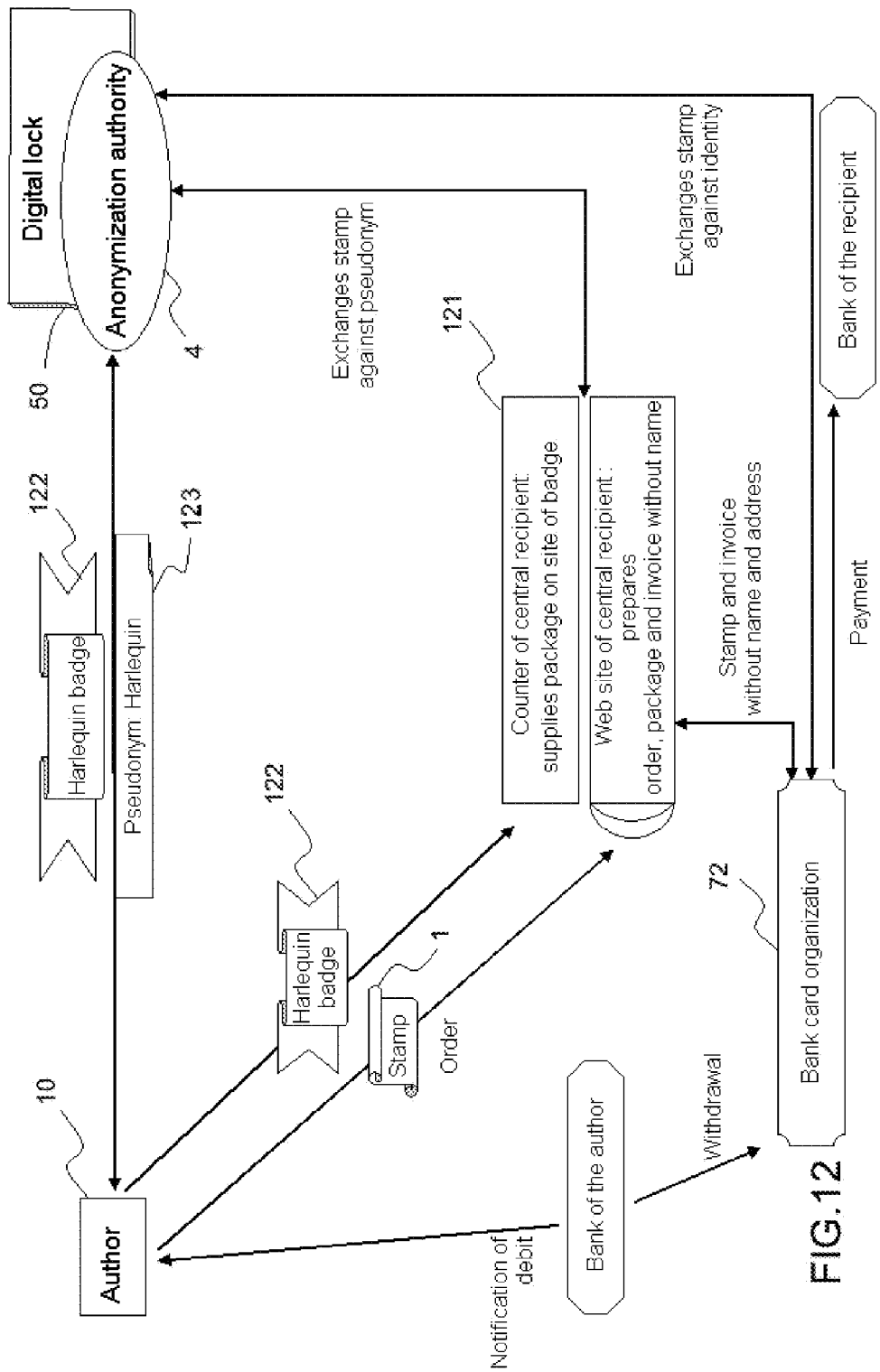
FIG. 12, arrangements in which pseudonyms or cryptonyms according to the invention find extension and usage in the material social or economic life.

FIG. 12 shows the arrangements in which pseudonyms and polynyms or cryptonyms according to the invention are capable of extensions and usages in the material economic or social life.

The triple level consisting of a real identity covered by stamps functionally masking this identity and themselves able to be attached to one or more pseudonyms 123 can be used in real life. A pseudonym can in this way be expressed, as a substitute for the real conventional identity, on a hardware physical medium, such as a kind of identity card, a smart card, a ticket, a token or else a form of tattoo or header that are all personalized. This could find a use, for example, for coming to withdraw from a counter or to justify to an inspector an order previously made and paid for by telecommunication.

The author for example of an order on the Internet or via his cell phone could on the one hand be debited according to the modalities already expressed in FIG. 7, but could also go to a counter 121 to collect the purchased object or service. He will then arrive furnished with a physical medium 122 such as a badge marked with his pseudonym, Harlequin for example, and delivered by the anonymization authority 4. The counter will have received the equivalence between the stamp that is present in the order mail 1, and this pseudonym. Protection measures for the badge can be envisaged, either inside the medium, or additional overlaps between certain codes or distinctive marks that are present on this medium and referenced by the anonymization authority or the lock.

Figure 13:
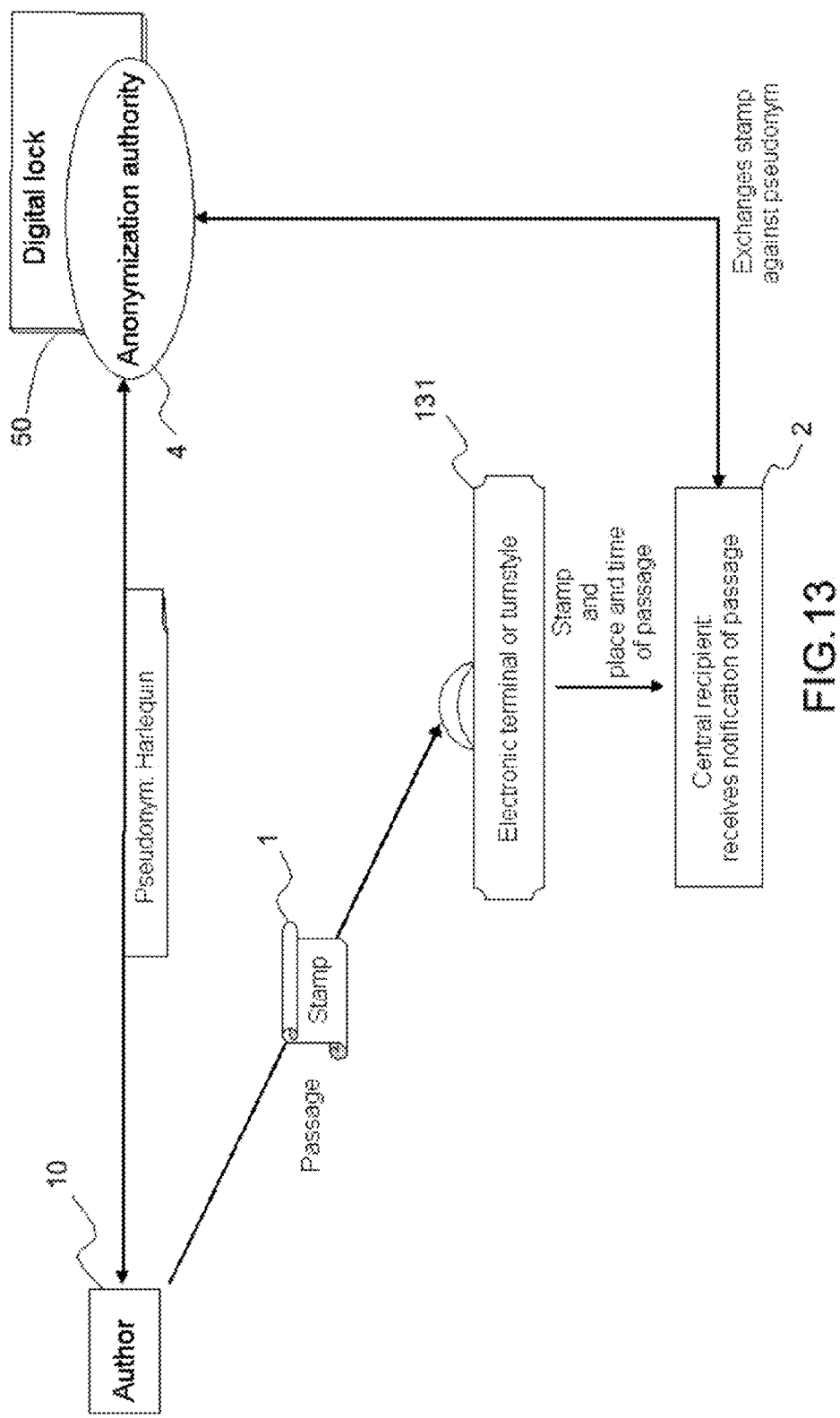
FIG. 13, a mode of deployment of the method according to the invention making it possible to anonymize and to restrictively frame the storing of a stream for which the author does not have full freedom of choice of the intended recipient, a full freedom to activate or not activate this stream, or else a full control over the system transmitting this stream.

FIG. 13 shows a mode of deploying the method according to the invention that makes it possible to anonymize and restrictively frame the storage of a stream 1 for which the author 10 does not have complete freedom of choice of recipient 2, complete freedom to activate or not activate this stream, or else full control over the system transmitting this stream. This situation is frequent, involving communication media for single use or with a single manager, such as public transport companies. The latter frequently opt on the question of anonymization either for an erasing of memory in one or more stages, hence subsequent to the storing, or for an anonymization prior to the manufacture and delivery of the medium. The present solution would be inserted between the aforementioned two options.

The electronic travel ticket of a person would not be indicated in terms of identity to the entry terminals 131 other than by the stamp functionally masking any other identity attribute. This stamp would optionally subsequently be transmitted to the anonymization authority 4 or the lock via a central recipient 2 if there is a desire to profile the behavior over time, but would be known only by the invariant pseudonym transmitted in return.

As a second example, it may involve a mobile telecommunications operator for which the terminal of each subscriber intermittently sends a signal to the network of relay antennas in order to indicate its current geographic position in the event of a call coming from a third party. Failing anonymization according to the present invention, many of these devices culminate in forms of traceability that cause the respect of privacy to depend on a random securing of the holding or of the erasure of the corresponding data or of a deontology that is difficult to verify. A similar technical solution would also find application in some communicating terminals or media and in dialog both with terrestrial or onboard terminals and with positioning and geolocation satellites.

This way would be all the more desirable if such dialogs, when they are carried out with a single manager, relate generally to the sole will of the latter.

Through the method according to the invention, such a manager knows the behavior of a user only through the stamp corresponding to a pseudonym. Depending on the chosen situations, he might or might not furthermore continue to manage a client in parallel while this time knowing him through his identity and then notably through his successive payments. However, even in the case of a similar parallel knowledge of his real identity, the manager could not establish a link with a given behavioral profile amongst all his clients. This slicing option would allow him, on the nominative side, to verify the unpaid amounts or, amongst other relational possibilities, to provide him with discounts or advantages arising from his position as a client.

A third exemplary application would concern the software publishers or manufacturers of electronic components capable of communicating directly and at their immediate or programmed initiative with a software program or item of equipment installed on the terminal of a user. The fact of desiring to ascertain online a fault, a behavior or a general state would be attached solely to just the stamp of this user. This procedure would be in parallel and decoupled from that of managing the relationship with the client as a known buyer or payer, according to a partitioned deployment mode: anonymization authority optionally coupled to a lock on the one hand, and peripheral recipients on the other hand. The term "buyer" is broadened to the forms of current contractualization in information technology such as the location.

FIG. 14 shows a method according to the invention in which the recipient 2 of mail 1 will have access to attributes of identity or of information that are present in the communication protocol, but without knowing the nature and the detail of his relationship to be followed with him. In this way he will be informed only of the existence of this link.

This particular mode of deployment of the method according to the invention would move away from the basic functions derived from the presence of this stamp. These optional basic functions being, as a reminder:

making it impossible to ascertain the whole content of the mail;

making it impossible to ascertain a portion of the content of the mail, previously indicated by the examples of inserts, boxes or other detachable coupons;

making it impossible to ascertain attached documents.

The dominant and constant function above remaining that of making it impossible to ascertain all or part of the rest of the protocol.

In an inversion, it would be possible, in the case of presence of a stamp in this protocol, for the central recipient 2, and only him, to have the right to read this protocol and therefore to know the author 10 at least through his telecommunications coordinates, but without being able to gain access to all or some of the content. This content that remains unknown to him would be transferred to peripheral recipients, said content being watered down by the amputation of its initial protocol. This transmission will concern, in whole or in part for example, the content of the mail and of any attached documents. The peripheral recipients 72, and indirectly 141 and 142, will obtain via the lock or from the anonymization authority 4, against presentation of the stamp, the information and instructions necessary for the correct implementation of their task, such as the bank account to be debited.

In this way, the central recipient 2 would be able to have a particular author as a client, as a member or interlocutor, but would remain ignorant of the service that will be supplied to him. In a similar case, if the service gave rise to a billing or another accounting entry, the amount concerned would finally be for example able to be immersed in the mass of the other receipts and would remain unknown in detail by the central recipient. Such a situation could usefully find an application for gifts paid to a charity or for an online survey, when the authors do not want the amount paid by each person to be known to the recipient or to the ultimate beneficiary. The latter would know who to thank without being able to make a judgment concerning the respective amounts. The spectrum involved would range from a fund for taking retirement, to a donation giving right to a tax break itself managed by an ad hoc peripheral recipient. A related option would be for the central recipient 2 again to retain only the protocol but without having the right to know anything else therein other than the stamp. In this way, he would be informed of the loyalty of a particular anonymous interlocutor, of the deed of transmittal made by this author for his attention, and would be capable of ensuring that the mail arrived safely. This feedback in the form of acknowledgement being carried out, with no communication address being available, by a peripheral recipient such as a telecommunications operator.

Figure 15A:
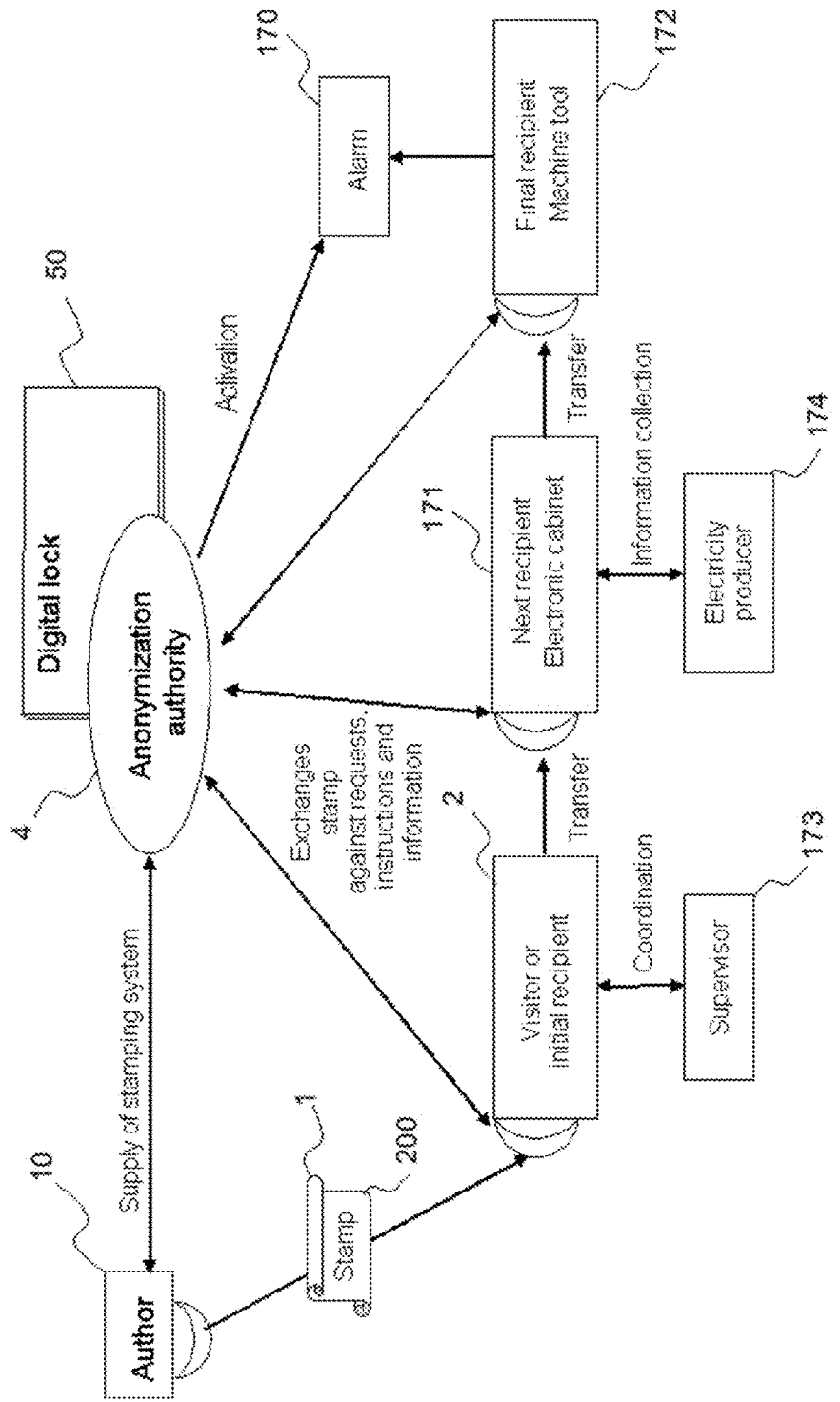
FIG. 15a, a use of the device in an inter-company or inter-site relationship for administrative or productive purposes.

FIG. 15*a* shows one use of the device in a relationship such as between businesses or between sites in which the stamp will allow the delivery of data or of signals. A computer file 1 of which the protocol bears a stamp, and which is retained on the computer of an "author" company 10 receives the visit or else the download request from an employee of a partner business, or from another site, who wishes to use the content thereof. The presence of the stamp initially refers this visitor or recipient 2 to the anonymization authority 4 or the lock, which deliver to him conditions, requests, instructions or information that is prior, simultaneous or after the possible authorization of access or of downloading, an authorization of the functional type but which may also take hardware forms such as a key for deciphering the content. Identification and authentication tools may be employed on this occasion. The authorization or interdiction may also relate to the processing, the storage or the retransmission of all or part of the file and of its content.

In the present case, a request may be to provide evidence of a prior agreement granted by the holding business to this partner. An instruction can be to notify a supervisor 173 or send him a copy of any subsequent action taken with this content. The supervisor being able for example to be a technician the presence of whom is considered indispensible, a manager who must be informed or whose countersigning is desired, an accounts or legal department responsible for recording this use in its books, as well as a standalone technical system such as a timer which will register for example the duration of consultation of the stamped file, in a situation in which a charge will be based on a duration.

The employee who has for example downloaded the file can forward it to a subsequent recipient 171 for the purposes of carrying out a task. In the example in which the content of the file corresponds to the dimensions of a part to be machined, the initial stamp may retain a complete role, and oblige the successive recipients to contact the anonymization authority or the lock. An electronic cabinet managing the production of a workshop, and receiving it, can in this way signify a level of urgency of manufacture, supplemented by an obligation to take note of the tariff chart originating from the accredited electricity producer. Depending on the degree of urgency, in the face of the instruction to optimize the costs of manufacture, arbitration can be carried out in the cabinet as to whether or not to wait for a low tariff period corresponding to low collective consumption times, without a production peak or a risk of overloading the internal or external distribution networks. At the appropriate moment, the numerically controlled machine 172 receiving in its turn the stamped file, amongst other possibilities, can be notified of the activation, prior to its being started up, of an audible signal warning the surrounding workers or maintenance staff to keep a safe distance. This safety or alarm system 170 also being able to be activated directly by the anonymization authority.

This device, presented as being an inter-site device, also applies to an entity that must ensure its autonomy and its self-control, such as an aircraft cell where various items of electrotechnical equipment for the transmission of orders must ensure that they work correctly at each step, notably for fly-by-wire aircraft.

Figure 15B:
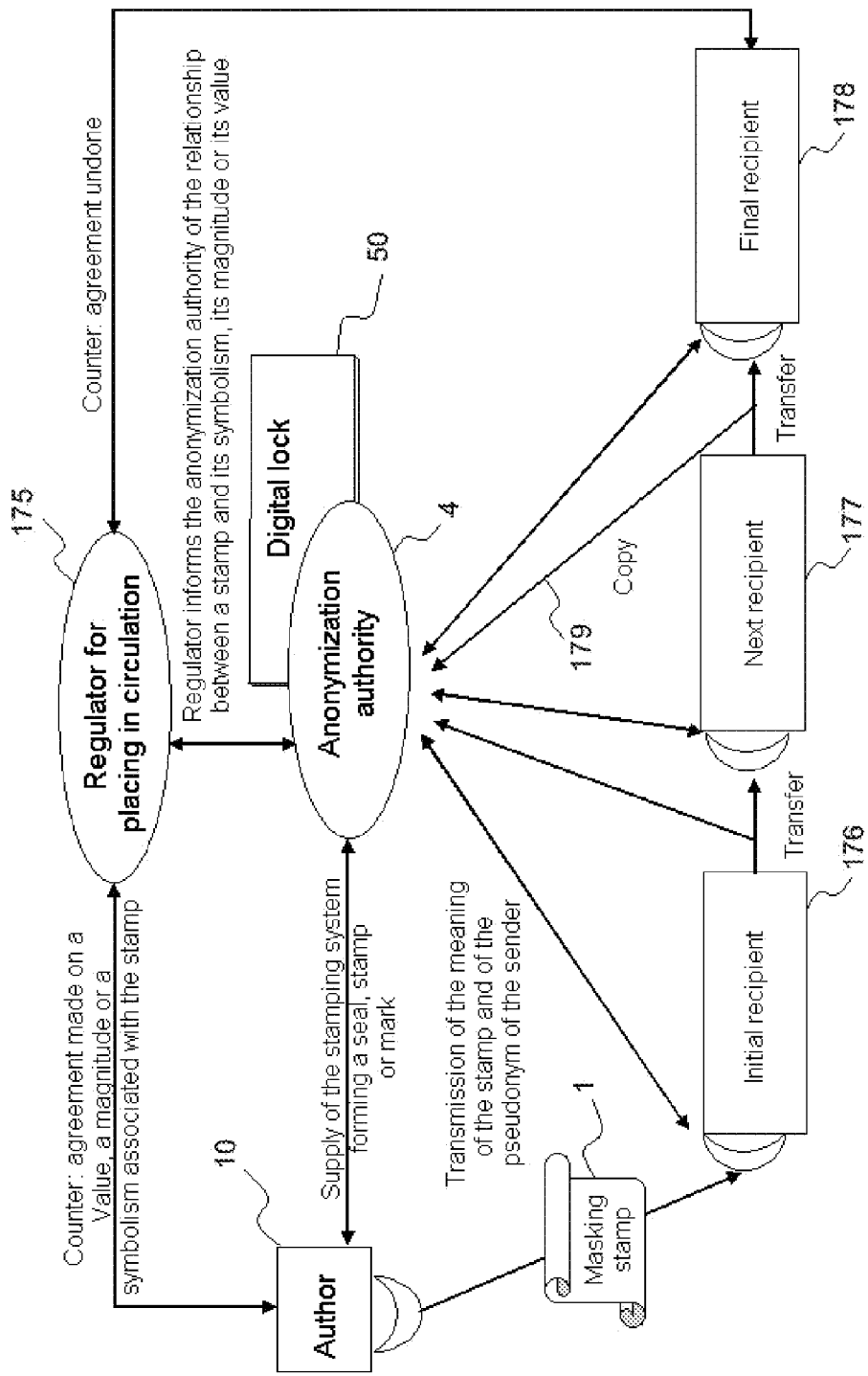
FIG. 15b, a configuration of use as a seal, stamp or handover baton, passing between successive carriers, and transmitting a meaning, a magnitude or an agreed value, or a form of exclusivity.

FIG. 15*b* illustrates a configuration of use in which the stamp 200 is similar to a seal, a postage stamp or a handover baton passing from the author 10 to successive recipients 176, 177, 178 being the carrier and the transmitter of a meaning, of a magnitude or of an agreed value or else of a form of exclusivity.

The concept of seal emphasizes the impossibility of gaining access without authorization to a content or to a meaning, the concept of postage stamp emphasizes the possibility of a face value, and the handover baton expresses a release for the benefit of a new carrier, while conserving this initial value, this magnitude or this symbolism.

A stamp endorsing such a representiveness, therefore wishing to be clothed in trust, means that it cannot be falsified or imitated and reproduced in series, arduous criteria to be obtained within technologies in which the ability to clone is virtually inherent. This weakness can however be avoided with the present device through the fact that a global trust is not placed only in the technical stamp but also in the trust that the community that carries out the interchanges invests itself and its solidarity with, and in the trust that it grants to the organization that grants them. The combination of these three sub-portions of the trust builds the total thereof and a reduction in one of them, to the extent that it does not reach an unacceptable level can often be offset by a rise in one of the other two.

Through its functions of homologation, removal or suspension of the authors and recipients, via its latitude to grant or withdraw a system of stamping or of counter-keys, the anonymization authority 4 assumes a role of federator of communities. Communities capable of good internal cohesion because they share, for example, the same ethic or the same behavioral standards incorporated in these stipulations in order to be and to remain homologated. Transferring these properties of transparency and of verifiability in telecommunications, while shifting to a broader spatial and quantitative scale, is usually difficult because the latter, and above all the Internet, on the contrary work on the basis of anonymity if not of the use at will of false identity. Again, the device according to the invention will alleviate this dilemma by being both a tool that makes it possible to know others, while leaving them anonymous, through its system of pseudonyms. The anonymization authority or the lock, informing the successive recipients of the meaning, of the magnitude or of the value attached to the stamp per se can in effect present the sending author under his pseudonym 74 as well as through his true identity. This real identity hitherto having been able to remain inaccessible to these recipients through the stamp functionally masking the telecommunication identity of its author.

Moreover, the fact that the stamp expresses what it represents only via this request from the recipient 176, 177, 178 to this authority or to the lock makes it possible to trace its journey, to guarantee that it is not counterfeited or duplicated at least not other than according to a charter of use agreed within the community. This being so, the anonymization authority is invested with a status of observer of streams, and of guarantor that, in the desired proportions, the adage of nothing is created, nothing is lost is applied thereto. It is the issuer of the stamping system and then the observer bringing its caution in terms of traceability, that is partly likened in its result to a transmittal with acknowledgement of receipt.

Trust can therefore be capitalized in and around the anonymization authority:
  in the authority itself, through its independent status, as an arbiter, as a memory and as a referral agent;
  in the stamp, through the technical capabilities of the anonymization authority to make it robust;
  in the trust that the community has in itself, and which flows from the correct application by the anonymization authority of its regulating powers. A point that is increased by the unintrusive visibility that the pseudonym system provides.

Being an organization that issues the stamping system, the anonymization authority can thereby associate itself or merge with another organization 175 capable of conferring on it or having it recognize a magnitude, a value, or a given symbolism, and give it free rein. This organization, simultaneously a regulator and a guarantor, can for example be a railroad company if the stamp gives rise to temporary exclusivity to use a track, granted to a particular recipient. It may involve a postal administration which applies a face value to a kind of digital stamp or seal during a secure routing over networks. It may also be an online service company, a commercial site, a private bank or even a central bank in the case of a face value taking a monetary dimension. This latter application being only the addition of a stamp having a value and able to be handed over like a handover baton.

However, the principle of partitioning that supports the present invention is predisposed to split the roles in order to maintain the philosophy of protecting the digital privacy of the users. The articulation between this anonymization authority which is the "issuer of the stamp" and a service provider or a regulator 175, an "issuer of value", would express the device in its most advantageous variant. A midway option would be for the anonymization authority to delegate this task of setting a value, a magnitude or a symbolism to a third party. In these last two situations, the basic issuer actually however remains the anonymization authority, since it is on it that an agreed meaning is superposed. All that the split does is confer the title of organization issuing value or symbolism, but not its material expression, to the player who, in railroad or postage terms, regulates the traffic. Or who, in banking terms, regulates the transfers, manages the accounts and the conversion of these monies, grants possible loans, opens and closes accounts. These various third parties inform the anonymization authority of the meaning of a future stamp concerning a particular author with which they have just contracted.

The risk of duplication of the stamp by a player, and then the transmission of clones to several players, remains circumscribed by the fact that the receipt and hence the "endorsement" by a recipient will be recorded by the anonymization authority 4 when this recipient presents the clone to it in order to ascertain its meaning. Any inappropriate duplicate will thereby be identified by the authority and all the more if the device retains the additional option of a copying 179 by the sending author to the anonymization authority and which indicates to him this form of acceptance of virtual dispossession.

This antiduplication property will be rightly qualified as a guarantor that a duplication remains within the agreed quantitative limit, since the anonymization authority will list the number of receipts of one and the same stamp issued by a given author or, to use imagery, the number of times the mail has been opened.

An alternative way of reducing the danger of possible uncontrolled duplicates would be to make them partially lose this undifferentiated status by personalizing them at the first step, a principle moreover that can be extended to other industrial or gaming usages. Without making the stamp lose its distinctive and particularizing character, its portion that is characteristic and furnished with functional and cryptonymic properties could be combined with additions or modifications indicating either its number of successive recipients, like a meter or digital notches, or more precisely their nature, their profile and even their identity. A mechanism like this would be likened to a real endorsement, in this instance leaving a freedom of choice between an endorsement by signature that is anonymized, pseudonymized or bearing a real identity.

Such a preservation of the trace of its successive recipients, according to a form of endorsement materialized for example in or around the initial stamp would find a counterpart in the fact that a stamp can express, in its formal appearance, a relation that is relative this time to the successive stamps of the author. These various relations could be expressed for example in a fully visible, filigreed, hidden or coded manner.

Another variant of application of this principle would take the form of several stamps furnished with formal relationships that can be detected and interpreted at least by certain recipients or certain observers. The latter possibilities would be similar to a device of the checkbook type in which each check is attached by its referring agents to one and the same stub, while being supplemented by other referring agents that particularize it in one go or gradually.

Again, such a configuration would provide only one variant of a mission that the anonymization authority is capable of fulfilling, via the type of information that it delivers to each new recipient. Just as it can replace a stamp that it considers null and void or obsolete, with another which retains the imprint thereof.

The invention claimed is:

1. A method for securing and controlling data within a communication process between an author and at least one recipient, comprising:
   securing and controlling data by inserting at least one stamp in a computer or a communication protocol associated with a data stream by means of a stamping system, a stamp in the stamping system being a distinctive sign; the author using a secured account, administered by an anonymization authority, and said stamp being used to identify itself with said anonymization authority;
   at least one additional data item having been registered with the anonymization authority and placed in the secured account;
   reading, at the least one recipient, said communication protocol by means of a reading system for detecting a presence of said stamp and then in extracting all or part of the additional data item from the anonymization authority or from the secured account, said extracting being carried out from the secured account, an access to the secured account being carried out using a correspondence between a lock device and said stamp, the lock device implementing a cryptographic protocol for access to said secured account, and said lock device and said stamp being respondents of each other, the stamp carrying a secret to open the lock device.

2. The method as claimed in claim 1, wherein, the stamp is cryptonymic and is attached to at least one pseudonym of the author.

3. The method as claimed in claim 1, wherein the data stream is found, on receipt at the at least one recipient or upstream of the at least one recipient, partitioned and channeled by portions of instructions, said portions being able to be predetermined, and said partitioning and channeling being carried out according to the instructions received from the anonymization authority or via the lock device, by the means of the stamp.

4. The method as claimed in claim 1, wherein the communication protocol of the data stream is found, on receipt at the at least one recipient or upstream of the at least one recipient, partitioned and channeled by portions, said portions of the communication being predetermined, and said partitioning and channeling being carried out according to the instructions received from the anonymization authority or via the lock device, by the means of the stamp.

5. The method as claimed in claim 1, wherein the stamp corresponds to different responses or different ways of responding by the anonymization authority and the lock device, to different functionalities or modalities, or different delivery modes, depending on an intended recipient in the at least one recipient, a context and an environment in which the intended recipient moves, a chronology or a location of facts associated with the communication, a way of acting or of being of the intended recipient, a nature of data or of a signal corresponding to the stamp or to what the stamp will apply, the different functionalities or modalities, or different delivery modes being pre-established and discriminated according to items agreed with the author, and endorsed on a per-case basis in one or more steps.

6. The method as claimed in claim 1, wherein, on the one hand, the stamp acting as the key and, on the other hand, said lock device are each totally or partly the respondent of the other, either as a profile and a counter profile, or as an image and its negative, either as a die and its work, or as a scratch and its scar, a complementarity of the stamp and the lock device toward a whole or toward a succession generating capabilities of a dialog, of a correspondence, of a reconstitution of a whole or of a filiation, for purposes of validation, identification or authentication, of actuation of a signal or of a mechanism, of expression of a meaning or of an instruction, or of a positive connection between the lock device and the stamp.

7. The method as claimed in claim 1, wherein the stamp opening the lock device engages an access, an actuation of a form of an antechamber or a door giving onto a reserved space, a mechanism or a registration, an action or a technical reaction, or an informative or a declarative signal.

8. The method as claimed in claim 1, wherein the lock device exists, independently of the secured account or other subordinated device, for validation of an authenticity and an actuality of the stamp acting as a key.

9. The method as claimed in claim 1, wherein the lock device, is furnished with portions that are invisible to the at least one recipient, allowing a validation of a cryptonymic stamp, or of the data item that has remained unknown to said at least one recipient and corresponding to the invisible portions, or a validation of a link between the cryptonymic stamp and an unknown portion of the cryptonymic stamp, or a validation of a link between several unknown portions of the cryptonymic stamp, said unknown portion being a pseudonym, a real identity, a remainder of said communication protocol, or a content of a file or of a mail.

10. The method as claimed in claim 1, wherein the lock device, when tested by the stamp, appends or inserts additional data in, with, around or on the stamp.

11. The method as claimed in claim 1, wherein an operating instruction transmitted or accessible via the stamp is an authorization, an interdiction, that are total or partial and are discriminated, an enactment of requests or of conditional clauses, an activation, a modification or a stopping of a function of the at least one recipient.

12. The method as claimed in claim 1, wherein the data stream includes a file having only the communication protocol marked with the stamp, excluding a content.

13. The method as claimed in claim 11, wherein a functional instruction relating to the interdiction of processing, of reading, of communication or of placing in a memory of certain data items at the at least one recipient is accompanied by an orientation toward another peripheral recipient provided for the communication, the functional instruction relating to a content of the data stream, of a file or of a remaining portion of the communication protocol.

14. The method as claimed in claim 1, wherein the stamp is used by successive recipients as a sign that is characteristic or of recognition between the successive recipients or with the author, and for obtaining from the anonymization authority or a lock, a correspondence between the stamp and attributes of an identity to which said stamp is attached, or other data item or a signal, preserved by the successive recipients or the author for the purpose of said communication.

15. The method as claimed in claim 1, wherein the anonymization authority or the lock device holds a type of instruction, the data item or a signal relating to a management of the data stream or of a file furnished with the communication protocol with the stamp, and a type of instruction, the data item or another signal connected to the stamp or to a given identity, but independent of said management and for making the data item or the another signal available from the author to the at least one recipient, said at least one recipient or a homologated third party using said correspondence or said data items to accomplish another task devolved to it by a previous recipient or by the author of the data stream or of the file.

16. The method as claimed in claim 15, wherein said task adds an item of information, received from the anonymization authority or from the lock device, on the another task that has remained partly or totally anonymous or incomplete, or awaiting identity attributes required for using the another task, conveying or finalizing the another task, said another task relating to an electronic transaction between the author of the communication and a main recipient.

17. The method as claimed in claim 15, wherein the task adds an item of information, received from the anonymization authority or from the lock device, on the another task that has remained partly or totally anonymous or incomplete, or awaiting identity attributes required for using the another task, conveying or finalizing the another task, said another task relating to a conveyance that is physical or by telecommunication between a main recipient or a peripheral recipient and the author.

18. The method as claimed in claim 15, wherein said task adds an item of information, received from the anonymization authority or from the lock device, on the another task that has remained partly or totally anonymous or incomplete, or awaiting identity attributes required for the another task, conveying or finalizing the another task, said another task relating to a writing game, that is carried out between the author and a main recipient or a peripheral recipient.

19. The method as claimed in claim 15, wherein said task adds an item of information, received from the anonymization authority or from the lock device, on the another task that has remained partly or totally anonymous or incomplete, or awaiting identity attributes required for the task, conveying or finalizing the another task, said another task relating to a verification of an operation, of a behavior, of a state, of an integrity or of an authenticity relating to a communication terminal or a medium, and mechanisms that are connected thereto.

20. The method as claimed in claim 1, wherein the anonymization authority is notified of the at least one recipient delegated to a task or a role by the author or by a previous recipient.

21. The method as claimed in any claim 1, wherein a file or mail content, furnished with technical capabilities of interaction with a respective environment, which render certain components thereof active and autonomous, begins a dialog with its own protocol, and makes a use of the stamp that is identical to that of an external recipient.

* * * * *